(12) United States Patent
Datta et al.

(10) Patent No.: US 12,450,491 B2
(45) Date of Patent: Oct. 21, 2025

(54) THERMALLY ADAPTIVE SCAN SEQUENCING FOR COMPUTED TOMOGRAPHY SCANNERS

(71) Applicant: GE Precision Healthcare LLC, Milwaukee, WI (US)

(72) Inventors: Arka Datta, Waukegan, IL (US); John M Boudry, Waukesha, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 948 days.

(21) Appl. No.: 17/648,390

(22) Filed: Jan. 19, 2022

(65) Prior Publication Data

US 2023/0229925 A1 Jul. 20, 2023

(51) Int. Cl.
*G06N 3/084* (2023.01)

(52) U.S. Cl.
CPC .................... *G06N 3/084* (2013.01)

(58) Field of Classification Search
CPC ........... G06N 3/084; G06N 3/045; G06N 3/08
USPC ........................................................ 382/131
See application file for complete search history.

(56) References Cited

U.S. PATENT DOCUMENTS 7,313,216 B2  12/2007  Nishide et al.
9,299,171 B2   3/2016  Bredno et al.

FOREIGN PATENT DOCUMENTS

CN        110916696 A  *  3/2020  ............. A61B 6/032

\* cited by examiner

*Primary Examiner* — Charlotte M Baker
(74) *Attorney, Agent, or Firm* — Amin, Turocy & Watson, LLP

(57) ABSTRACT

Systems/techniques that facilitate thermally adaptive scan sequencing for computed tomography scanners are provided. In various embodiments, a system can access a set of scanning protocols performable by a computed tomography scanner. In various aspects, the system can further access a current thermal state of the computed tomography scanner. In various instances, the system can identify, in the set of scanning protocols and based on the current thermal state, a scanning protocol that is predicted to reduce or control thermal stresses experienced by the computed tomography scanner. In various cases, the system can cause the computed tomography scanner to perform the identified scanning protocol.

20 Claims, 22 Drawing Sheets

(5 of 22 Drawing Sheet(s) Filed in Color)

THERMALLY ADAPTIVE SCAN SEQUENCING FOR COMPUTED TOMOGRAPHY SCANNERS

TECHNICAL FIELD

The subject disclosure relates generally to scan sequencing, and more specifically to thermally adaptive scan sequencing for computed tomography scanners.

BACKGROUND

The components of a computed tomography (CT) scanner undergo thermal stress each time a CT scan is performed. In various cases, such as during CT calibration, it is desired to perform multiple CT scans in sequence. Performing a sequence of CT scans often causes thermal stresses to accumulate in the components of the CT scanner. Existing techniques attempt to protect the components of the CT scanner from such accumulated thermal stress by inserting fixed or variable time delays between successive CT scans. Unfortunately, however, this can result in CT scan sequences that are excessively time-consuming.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate thermally adaptive scan sequencing for computed tomography scanners are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various aspects, the receiver component can access a set of scanning protocols performable by a computed tomography scanner. In various instances, the computer-executable components can further comprise a thermal component. In various cases, the thermal component can access, via one or more temperature sensors, a current thermal state of the computed tomography scanner. In various aspects, the computer-executable components can further comprise an analysis component. In various instances, the analysis component can identify, in the set of scanning protocols and based on the current thermal state, a scanning protocol that is predicted to reduce thermal stresses experienced by the computed tomography scanner. In various cases, the computer-executable components can further comprise an execution component. In various aspects, the execution component can cause the computed tomography scanner to perform the identified scanning protocol.

According to one or more embodiments, the above-described system can be implemented as a computer-implemented method and/or a computer program product.

DESCRIPTION OF THE DRAWINGS

The patent or application file contains at least one drawing executed in color Copies of this patent or patent application publication with color drawing(s) will be provided by the Office upon request and payment of the necessary fee.

DETAILED DESCRIPTION

Figure 1:
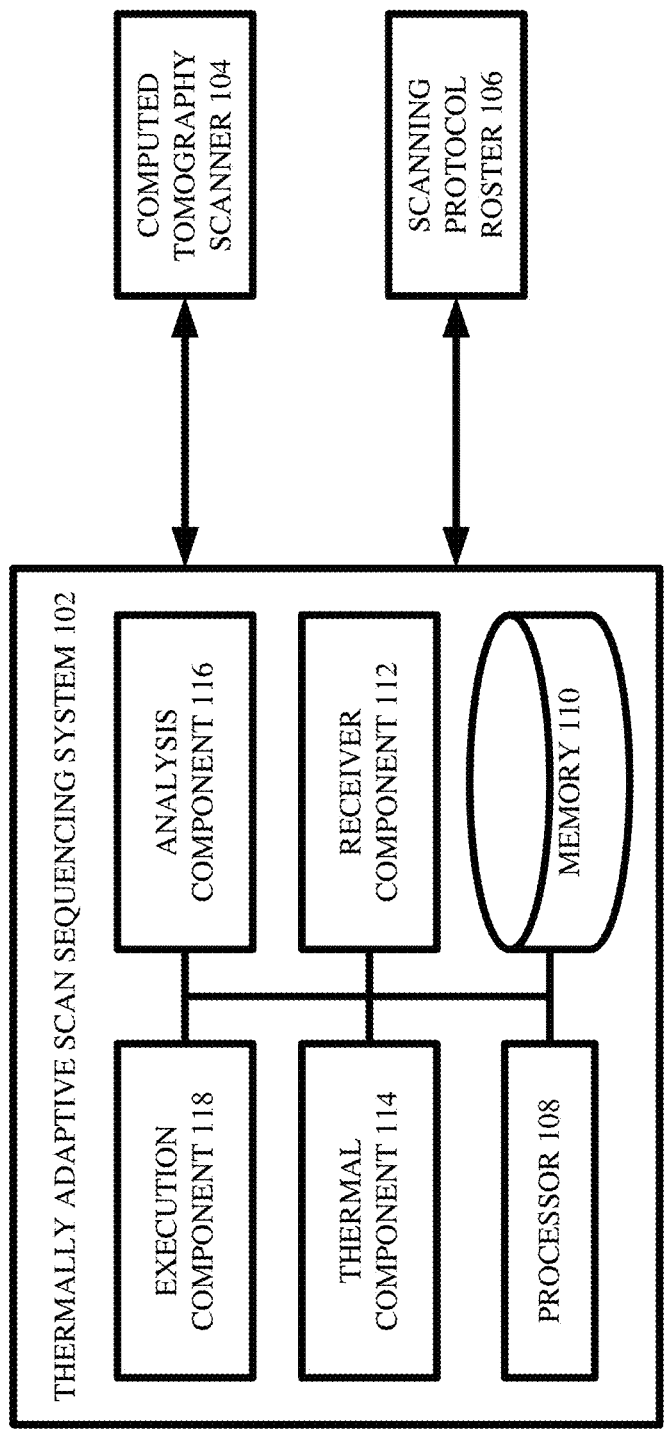
FIG. 1 illustrates a block diagram of an example, non-limiting system that facilitates thermally adaptive scan sequencing for computed tomography scanners in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The components of a computed tomography (CT) scanner can experience thermal stress each time a CT scan is performed. In particular, the CT scanner can include one or more X-ray tubes, and such X-ray tubes can heat up (e.g., increase in temperature) each time a CT scan is implemented and/or otherwise executed.

In various cases, it can be desired to perform multiple CT scans in sequence. For example, calibration of a CT scanner can require execution of a CT scan sequence (e.g., can require sequential execution of multiple CT scans, one scan at a time) to ensure that the CT scanner is properly functioning. As another example, a CT scanner that is serving multiple medical patients can be required to execute a CT scan sequence (e.g., one or more CT scans per patient, one patient at a time). In any case, an unfortunate side-effect of performing a sequence of CT scans can be accumulation of thermal stresses in the components (e.g., X-ray tubes) of the CT scanner, which can potentially damage the CT scanner. More specifically, if multiple CT scans are sequentially performed by a CT scanner, heat can build up in the components of the CT scanner during each individual CT scan. Such heat can accumulate and/or compound throughout the sequential execution of the multiple CT scans, which can cause the components of the CT scanner to achieve very high temperatures.

Existing techniques attempt to protect the components of the CT scanner from accumulated thermal stresses by inserting fixed or variable time delays between successive CT scans. That is, when existing techniques are implemented, a first CT scan is performed which can cause the components of the CT scanner to heat up, then a first time delay is implemented which allows the components of the CT scanner to cool down (e.g., which allows the heat generated by the first CT scan to dissipate), then a second CT scan is performed which causes the components of the CT scanner to heat up again, then a second time delay is implemented which allows the components of the CT scanner to cool down again (e.g., which allows the heat generated by the second CT scan to dissipate), and so on. In other words, existing techniques rely solely on modulation of time delay duration to protect the CT scanner from accumulation of thermal stresses (e.g., to protect the CT scanner from overheating). Unfortunately, such existing techniques can result in CT scan sequences that are excessively time-consuming (e.g., can result in time delays that are longer than necessary).

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate thermally adaptive scan sequencing for computed tomography scanners. More specifically, the inventors of various embodiments described herein recognized that existing techniques for protecting CT scanners from accumulation of thermal stresses rely solely on configuration of time delay duration (e.g., rely solely on lengthening and/or shortening the durations of time delays between successive CT scans). Moreover, the present inventors further realized that accumulation of thermal stresses in a CT scanner can be not only a function of time delay duration, but can also be a function of order of execution of CT scans. In other words, the present inventors recognized that changing the order in which multiple CT scans are sequentially performed can significantly affect the total accumulation of thermal stresses experienced by a CT scanner.

For example, consider a set of three unique CT scans that are desired to be sequentially performed via a single CT scanner: a scan A, a scan B, and a scan C. If the CT scanner first performs the scan A, then performs the scan B, and lastly performs the scan C, the CT scanner can experience a given amount of thermal stress accumulation. In other words, if the CT scanner performs such scans with a sequential order of A-B-C, the CT scanner can reach a given maximum temperature and/or a given average temperature. However, if the CT scanner instead first performs the scan B, then performs the scan C, and then lastly performs the scan A, the CT scanner can experience a different amount of thermal stress accumulation. That is, if the CT scanner performs such scans with a sequential order of B-C-A, the CT scanner can reach a different maximum temperature and/or a different average temperature. Thus, the specific order in which CT scans are performed can increase and/or decrease the accumulation of thermal stresses (e.g., the maximum temperature and/or average temperature) experienced by the CT scanner.

Accordingly, the present inventors devised various embodiments described herein, which can automatically change (e.g., which can automatically adapt) the sequence and/or order of execution of CT scans, so as to reduce overall accumulation of thermal stresses (e.g., so as to reduce maximum temperature and/or average temperature) experienced by a CT scanner (e.g., experienced by X-ray tubes of the CT scanner). In other words, when given multiple CT scans that are desired to be sequentially executed, various embodiments described herein can be considered as identifying an intelligent and/or clever order in which for such multiple CT scans can be executed, which order can help to reduce maximum and/or average internal temperatures of the CT scanner. Thus, the CT scanner can be protected from overheating without requiring unnecessarily long inter-scan time delays.

Various embodiments described herein can be considered as a computerized tool that can facilitate thermally adaptive scan sequencing for computed tomography scanners. In various aspects, such a computerized tool can comprise a receiver component, a thermal component, an analysis component, and/or an execution component.

In various embodiments, there can be a list of scanning protocols which are desired to be sequentially performed, executed, and/or otherwise implemented via a CT scanner. In various aspects, the list of scanning protocols can include any suitable number of scanning protocols. In various instances, and as those having ordinary skill in the art will appreciate, a scanning protocol can be any suitable scan and/or scanning operation that is performable, executable, and/or otherwise implementable by the CT scanner. Moreover, as those having ordinary skill in the art will further appreciate, the characteristics of a scanning protocol can be controlled by commensurately controlling any suitable configurable parameters and/or any suitable configurable settings of the CT scanner. For example, configurable parameters/settings of the CT scanner can include a voltage level of the CT scanner, an amperage level of the CT scanner, a focal spot size of the CT scanner, and/or a collimation of the CT scanner. Accordingly, a given scanning protocol can be executed by activating the CT scanner when the CT scanner is set to a given voltage level, a given amperage level, a given focal spot size, and/or a given collimation (e.g., the given scanning protocol can be considered as corresponding to the given voltage level, the given amperage level, the given focal spot size, and/or the given collimation). Likewise, a different scanning protocol can be executed by activating the CT scanner when the CT scanner is set to a different voltage level, a different amperage level, a different focal spot size, and/or a different collimation (e.g., the different scanning protocol can be considered as corresponding to the different voltage level, the different amperage level, the different focal spot size, and/or the different collimation).

In some aspects, each of the list of scanning protocols can have a respectively corresponding availability flag. In various instances, an availability flag can be any suitable piece of electronic data that indicates whether or not a respectively corresponding scanning protocol is still available for execution. In other words, an availability flag can indicate whether or not its respectively corresponding scanning protocol has already been executed a threshold number of times. As a non-limiting example, it can be desired to execute each of the list of scanning protocols exactly once; thus, an availability flag of a scanning protocol can indicate whether or not the scanning protocol has already been executed once. As another non-limiting example, it can be desired to execute each of the list of scanning protocols exactly z times, for any suitable positive integer z; thus, an availability flag of a scanning protocol can indicate whether or not the scanning protocol has already been executed z times. As yet another non-limiting example, it can be desired to execute different ones of the list of scanning protocols different numbers of times (e.g., it can be desired to execute a given scanning protocol only once, but it can be desired to execute another scanning protocol z times). In any case, each of the list of scanning protocols can be desired to be executed a respective threshold number of times, and the availability flag of a given scanning protocol can indicate whether or not that given scanning protocol has already been executed by the CT scanner its respective threshold number of times.

In various aspects, an availability flag can be a binary digit and/or a Boolean variable, where one of the two possible values of such binary digit and/or Boolean variable can indicate that a respectively corresponding scanning protocol has not yet been executed its respective threshold number of times, and where the other of the two possible values of such binary digit and/or Boolean variable can indicate that the respectively corresponding scanning protocol has already been executed its respective threshold number of times. In other cases, however, an availability flag can be a counter and/or tally value (e.g., or a counter and/or tally ratio) that incrementally keeps track of how many times a respectively corresponding scanning protocol has been executed.

In any case, it can be desired to execute the list of scanning protocols on and/or via the CT scanner, in a sequential order that reduces and/or minimizes overall accumulation of thermal stresses experienced by the CT scanner. As described herein, the computerized tool devised by the present inventors can facilitate such execution.

In various embodiments, the receiver component of the computerized tool can electronically receive and/or otherwise electronically access the list of scanning protocols. In some instances, the receiver component can electronically retrieve the list of scanning protocols from any suitable centralized and/or decentralized data structure (e.g., graph data structure, relational data structure, hybrid data structure), whether remote from and/or local to the receiver component. In any case, the receiver component can electronically obtain and/or access the list of scanning protocols, such that other components of the computerized tool can electronically interact with (e.g., read, write, edit, manipulate) the list of scanning protocols.

In various embodiments, the thermal component of the computerized tool can electronically access a current thermal state of the CT scanner. More specifically, in various aspects, the thermal component can electronically interface with a set of temperature sensors (e.g., a set of thermometers, a set of thermistors) that are coupled to, affixed to, and/or otherwise integrated with various components of the CT scanner. In various instances, such set of temperature sensors can electronically measure and/or detect temperatures of various components of the CT scanner, and such measured/detected temperatures can be collectively considered as the current thermal state of the CT scanner. As a non-limiting example, the CT scanner can include any suitable number of X-ray tubes, one or more temperature sensors can be operatively coupled to each of such X-ray tubes, and the temperatures that are measured/detected by such temperature sensors can be considered as collectively forming and/or collectively representing the current thermal state of the CT scanner. As those having ordinary skill in the art will appreciate, the current thermal state can have any suitable data format and/or any suitable data dimensionality as desired (e.g., the current thermal state can be a scalar representing a single temperature of a single X-ray tube of the CT scanner; the current thermal state can be a row vector and/or column vector representing a single temperature of each of multiple X-ray tubes of the CT scanner; and/or the current thermal state can be a matrix and/or a tensor representing multiple temperatures of each of multiple X-ray tubes of the CT scanner).

In various embodiments, the analysis component of the computerized tool can electronically select, from the list of scanning protocols and based on the current thermal state of the CT scanner, a scanning protocol that is marked and/or flagged as still-available and that is predicted to help reduce and/or otherwise minimize overall accumulation of thermal stresses in the CT scanner. In other words, the analysis component can electronically determine which scanning protocol to perform next, based on the current thermal state exhibited by the CT scanner and with the goal of reducing the maximum temperatures and/or the average temperatures reached by the components of the CT scanner.

In some cases, the analysis component can choose the selected scanning protocol by applying any suitable analytical techniques to the current thermal state and/or to the list of scanning protocols. For example, the analysis component can iterate through each of the list of scanning protocols. For any given scanning protocol in the list, if the availability flag that corresponds to that given scanning protocol indicates that the given scanning protocol has already been implemented its threshold number of times, the analysis component can iterate to a next scanning protocol in the list. On the other hand, if the availability flag indicates that the given scanning protocol has not yet been implemented its threshold number of times, then the analysis component can predict a resultant thermal state that the CT scanner would achieve if the given scanning protocol were to be implemented/executed next. More specifically, the analysis component can predict such resultant thermal state by leveraging the current thermal state, by leveraging known characteristics of the given scanning protocol (e.g., voltage level of the given scanning protocol, amperage level of the given scanning protocol, focal spot size of the given scanning protocol, collimation of the given scanning protocol), and/or by leveraging any suitable heat transfer equations and/or thermodynamics formulas. After computing the resultant thermal state for the given scanning protocol, the analysis component can iterate to a next scanning protocol in the list. Once the analysis component has iterated through the entire (e.g., or less than entire, in some cases) list of scanning protocols in this fashion, the analysis component can choose as the selected scanning protocol that scanning protocol which corresponds to the most desirable resultant thermal state (e.g., in some instances, the most desirable resultant thermal state can be the resultant thermal state representing the lowest maximum temperature of the CT scanner).

In other cases, the analysis component can choose the selected scanning protocol by executing any suitable artificial intelligence techniques on the current thermal state and/or on the list of scanning protocols. For instance, the analysis component can electronically store, electronically maintain, electronically control, and/or otherwise electronically access a machine learning model. In various aspects, the machine learning model can exhibit any suitable artificial intelligence architecture as desired. For example, the machine learning model can exhibit a deep learning neural network architecture (e.g., a deep Q-learning network). In such case, the machine learning model can include any suitable number of layers (e.g., input layer, one or more hidden layers, output layer), can include any suitable numbers of neurons in various layers (e.g., different layers can have the same and/or different numbers of neurons as each other), can include any suitable activation functions (e.g., softmax, sigmoid, hyperbolic tangent, rectified linear unit) in various neurons (e.g., different neurons can have the same and/or different activation functions as each other), and/or can include any suitable interneuron connections (e.g., forward connections, skip connections, recurrent connections).

In various aspects, the machine learning model can be configured to receive as input both the current thermal state and/or the list of scanning protocols, and to produce as output an indication of the selected scanning protocol. More specifically, the current thermal state and/or the list of scanning protocols (e.g., one or more scalars, vectors, matrices, tensors, and/or character strings representing the list of scanning protocols) can be concatenated together, such concatenation can be received by an input layer of the machine learning model, such concatenation can complete a forward pass through one or more hidden layers of the machine learning model, and/or an output layer of the machine learning model can compute the indication of the selected scanning protocol based on activations provided by the one or more hidden layers of the machine learning model. In particular, if the machine learning model exhibits a deep Q-learning architecture, then the output layer of the machine learning model can compute a Q-value for each scanning protocol in the list of scanning protocols (e.g., for each still-available scanning protocol in the list of scanning protocols), and the scanning protocol that has the highest Q-value can be considered as the selected scanning protocol. In other words, a Q-value generated by the machine learning model can be considered as representing how well a respectively corresponding scanning protocol would serve the goal of reducing overall thermal stress experienced by the CT scanner (e.g., of reducing maximum and/or average temperature of the CT scanner), when given the CT scanner's current thermal state.

In any case, the analysis component can choose the selected scanning protocol, such that the selected scanning protocol is predicted to reduce overall and/or total thermal stress experienced by the CT scanner while the CT scanner executes each of the list of scanning protocols their respective number of times (e.g., is predicted to reduce the maximum temperature and/or the average temperature achieved by the CT scanner while the CT scanner executes each of the list of scanning protocols their respective number of times).

In various embodiments, once the analysis component identifies the selected scanning protocol, the execution component of the computerized tool can electronically instruct, command, and/or otherwise cause the CT scanner to execute and/or implement the selected scanning protocol. Moreover, in various aspects, the execution component can update the list of scanning protocols, by accordingly adjusting the availability flag that corresponds to the selected scanning protocol. As mentioned above, the analysis component can avoid choosing any scanning protocol that is no longer available for execution (e.g., any scanning protocol that has an availability flag indicating that it has already been executed its threshold number of times). Accordingly, the selected scanning protocol can have an availability flag indicating that it has not yet been executed its threshold number of times. So, if implementation/execution of the selected scanning protocol by the CT scanner causes the selected scanning protocol to now have been executed its threshold number of times, the execution component can electronically update the value of the availability flag of the selected scanning protocol. This can prevent the selected scanning protocol from being chosen again by the analysis component in future iterations.

In various embodiments, the thermal component, the analysis component, and/or the execution component can repeat various of the above-described functionalities. That is, after the CT scanner has executed the selected scanning protocol, the thermal component can measure a new current thermal state of the CT scanner (e.g., a thermal state that results from execution of the selected scanning protocol), the analysis component can choose a new selected scanning protocol from the list of scanning protocols based on the new current thermal state, and the execution component can cause the CT scanner to execute the new selected scanning protocol and/or can update the availability flag of the new selected scanning protocol accordingly. In various instances, the thermal component, the analysis component, and/or the execution component can repeat these functionalities, until all of the list of scanning protocols have been executed their respective number of times. Moreover, the functionality of the analysis component can help to ensure that the list of scanning protocols are executed in a sequential order that reduces the maximum temperatures and/or average temperatures reached by the CT scanner. In other words, thanks to the analysis component, the maximum temperatures and/or average temperatures achieved by the CT scanner during execution of all of the list of scanning protocols can be lower than such temperatures otherwise would have been if the list of scanning protocols were instead executed in a different sequential order.

As mentioned above, the analysis component can, in some cases, facilitate its functionality analytically (e.g., by applying thermodynamics formulas and/or heat transfer equations). In other cases, however, the analysis component can facilitate its functionality by executing a machine learning model (e.g., a deep Q-learning network). In order to accurately select scanning protocols that serve the goal of reducing overall thermal stress experienced by the CT scanner, the machine learning model should first undergo training. In various aspects, the machine learning model can be trained in a reinforcement learning fashion, as described herein.

In various embodiments, the receiver component can electronically access a training dataset. In various aspects, the training dataset can include any suitable number of training scanning protocol lists, and each training scanning protocol list can include any suitable number of training scanning protocols. In various instances, each training scanning protocol can be as described above (e.g., can be defined by a respective voltage level, a respective amperage level, a respect focal spot size, and/or a respective collimation level). Moreover, each training scanning protocol can correspond to an availability flag, just as described above (e.g., an availability flag can indicate whether a given training scanning protocol has already been executed a respective threshold number of times).

In various embodiments, the computerized tool can comprise a training component, which can electronically train the machine learning model of the analysis component in reinforcement learning fashion based on the training dataset, as described below.

In various aspects, the training component can randomly initialize the internal parameters (e.g., weights, biases) of the machine learning model.

In various instances, the training component can select any training scanning protocol list from the training dataset. Moreover, the training component can initialize a reinforcement learning reward, where such reinforcement learning reward can quantify, tally, and/or keep track of how well the machine learning model performs with respect to the training scanning protocol list. In various cases, the reinforcement learning reward can be a real-valued scalar having an initial magnitude of 0.

In various cases, the thermal component of the computerized tool can measure a current thermal state of the CT scanner. In various aspects, the analysis component can execute the machine learning model on both the current thermal state and the training scanning protocol list, which can cause the machine learning model to generate as output an indication of a selected training scanning protocol. More specifically, the current thermal state and the training scanning protocol list can be concatenated together, an input layer of the machine learning model can receive such concatenation, such concatenation can complete a forward pass through one or more hidden layers of the machine learning model, and an output layer of the machine learning model can compute the indication of the selected training scanning protocol based on activation maps yielded by the one or more hidden layers. As mentioned above, if the machine learning model exhibits a deep Q-learning architecture, then the output layer of the machine learning model can compute Q-values for each still-available training scanning protocol in the training scanning protocol list, and the training scanning protocol that has the highest Q-value can be considered as the selected training scanning protocol.

Note that, if the machine learning model has so far undergone no and/or little training, then the output (e.g., the Q-values) produced by the machine learning model can be highly inaccurate. That is, if the machine learning model has undergone no and/or little training, then the machine learning model can fail to select that training scanning protocol which would actually best serve the goal of reducing overall thermal stress experienced by the CT scanner throughout execution of the training scanning protocol list, when given the current thermal state.

In any case, the execution component can cause the CT scanner to execute the selected training scanning protocol, and/or the execution can update the availability flag of the selected training scanning protocol as appropriate. In various aspects, execution of the selected training scanning protocol can cause the CT scanner to heat up from the current thermal state to a resultant thermal state (e.g., can cause current temperature values of the X-ray tubes of the CT scanner to transition to higher temperature values). Moreover, in various instances, the thermal component can leverage its temperature sensors to determine, estimate, and/or record an amount of time (e.g., measured in seconds) that it takes for the resultant thermal state of the CT scanner to cool down to any suitable threshold thermal state (e.g., that it takes for the higher temperature values of the X-ray tubes of the CT scanner to transition and/or dissipate to any suitable threshold temperature values).

In various cases, the training component can electronically update the value of the reinforcement learning reward, based on the resultant thermal state and/or based on the amount of time. In other words, the training component can update the reinforcement learning reward value, based on how hot the X-ray tubes of the CT scanner got in response to execution of the selected training scanning protocol, and/or based on how long it took for the X-ray tubes of the CT scanner to cool back to any suitable predetermined threshold temperatures. In some cases, the magnitude of the reinforcement learning reward can vary inversely with the magnitude of the resultant thermal state (e.g., a higher reward can be given when the X-ray tubes heat up less in response to execution of the selected training scanning protocol; a lower reward can be given when the X-ray tubes heat up more in response to execution of the selected training scanning protocol). Likewise, in various aspects, the magnitude of the reinforcement learning reward can vary inversely with the amount of time (e.g., a higher reward can be given when the X-ray tubes cool down more quickly in response to execution of the selected training scanning protocol; a lower reward can be given when the X-ray tubes cool down more slowly in response to execution of the selected training scanning protocol).

In various aspects, once the training component updates the reinforcement learning reward, the thermal component can measure a new thermal state of the CT scanner, the analysis component can execute the machine learning model on the new thermal state so as to yield a new selected training scanning protocol, the execution component can cause the CT scanner to execute the new selected training scanning protocol, and the training component can again update the reinforcement learning reward based on how the CT scanner thermally responds to the new selected training scanning protocol. In various aspects, the thermal component, the analysis component, the execution component, and/or the training component can repeat this procedure until all trainings canning protocols of the training scanning protocol list have been executed their respective threshold numbers of times.

At such point, the reinforcement learning reward can be considered as fully quantifying the performance of the machine learning model with respect to the training scanning protocol list. Thus, the training component can electronically update the internal parameters of the machine learning model by performing backpropagation on the machine learning model, based on the reinforcement learning reward. In particular, such backpropagation can be driven by the reinforcement learning reward, as opposed to being driven by a standard error and/or loss value. For instance, rather than driving backpropagation via gradient descent with respect to an error and/or loss, the training component can drive backpropagation via gradient ascent with respect to the reinforcement learning reward.

In various aspects, the above training procedure can be repeated for each training scanning protocol list in the training dataset. The ultimate result of such training can be that the internal parameters of the machine learning model have become iteratively optimized for selecting/choosing scanning protocols that maximize the reinforcement learning reward. In other words, such training can cause the machine learning model to learn how to select next scanning protocols that are more likely to lead to less heat generation and/or to quicker cool-down times.

Accordingly, various embodiments of the subject innovation can include a computerized tool that can electronically receive a list of scanning protocols, that can electronically measure a current thermal state of a CT scanner, that can electronically identify (e.g., via a deep Q-learning network) a scanning protocol to perform next based on the current thermal state and the list of scanning protocols, where such identified scanning protocol can be predicted to reduce overall thermal stress experienced by the CT scanner, and that can electronically cause the CT scanner to execute and/or implement the identified scanning protocol. In other words, such computerized tool can dynamically determine an order in which the list of scanning protocols should be executed (e.g., can dynamically determine which scanning protocol should be performed next), so as to prevent the CT scanner from getting too hot while executing the list of scanning protocols (e.g., so as to reduce and/or otherwise control a maximum temperature and/or an average temperature achieved by the CT scanner throughout execution of the list of scanning protocols).

Various embodiments of the subject innovation can be employed to use hardware and/or software to solve problems that are highly technical in nature (e.g., to facilitate thermally adaptive scan sequencing for computed tomography scanners), that are not abstract and that cannot be performed as a set of mental acts by a human. Further, some of the processes performed can be performed by a specialized computer (e.g., deep learning neural network, temperature sensors, computed tomography scanners) for carrying out defined tasks related to thermally adaptive scan sequencing for computed tomography scanners. For example, such defined tasks can include: accessing, by a device operatively coupled to a processor, a set of scanning protocols performable by a computed tomography scanner; accessing, by the device and via one or more temperature sensors, a current thermal state of the computed tomography scanner; identifying, by the device, in the set of scanning protocols, and based on the current thermal state, a scanning protocol that is predicted to reduce thermal stresses experienced by the computed tomography scanner; and causing, by the device, the computed tomography scanner to perform the identified scanning protocol. Moreover, in various cases, the identifying the identified scanning protocol can include feeding, by the device, both the current thermal state and the set of scanning protocols as inputs to a deep learning neural network, and the deep learning neural network can produce as output an indication of the identified scanning protocol. In various aspects, as described herein, such a deep learning neural network can be trained in reinforcement learning fashion.

Such defined tasks are not performed manually by humans. Indeed, neither the human mind nor a human with pen and paper can electronically receive a list of scanning protocols, can electronically measure a thermal state of a CT scanner, can electronically execute a deep learning neural network on both the thermal state and the list of scanning protocols, thereby yielding an identified scanning protocol that is predicted to reduce thermal stresses of the CT scanner, and/or can electronically execute the identified scanning protocol on the CT scanner. Instead, various embodiments of the subject innovation are inherently and inextricably tied to computer technology and cannot be implemented outside of a computing environment (e.g., CT scanners, temperature sensors, and deep learning neural networks are inherently computerized devices that cannot be implemented by humans in the absence of computing technology; a computerized tool that utilizes a deep learning neural network and temperature sensors so as to determine and implement a thermally-beneficial sequential order in which to execute scanning protocols on a CT scanner is likewise an inherently computerized device that cannot be implemented in any sensible, practical, and/or reasonable way without computers).

Moreover, various embodiments of the subject innovation can integrate into a practical application various teachings described herein relating to thermally adaptive scan sequencing for computed tomography scanners. As explained above, existing techniques utilize inter-scan time delays as the only configurable variable for protecting a CT scanner from overheating. Unfortunately, relying only upon time delay insertion for protecting a CT scanner from overheating can result in CT scan sequences that are excessively time-consuming. In stark contrast, various embodiments described herein do not rely solely upon time delay insertion for protecting a CT scanner from overheating. Indeed, the present inventors recognized precisely what existing techniques did not: that the thermal state of a CT scanner is not just a function of the time delays inserted between successive CT scans, but is also a function of the sequential order in which CT scans are performed. Accordingly, various embodiments described herein can be considered as a computerized tool that identifies and/or determines a thermally-beneficial sequence and/or a thermally-beneficial order in which to execute multiple CT scans on a CT scanner. More specifically, the computerized tool can access a list of scanning protocols and can measure, via temperature sensors, a thermal state of a CT scanner. In various aspects, the computerized tool can identify which of the list of scanning protocols would, when given the current thermal state, best serve the goal of reducing the overall thermal stresses experienced by the CT scanner. In various instances, the computerized tool can then execute the identified scanning protocol on and/or via the CT scanner. As mentioned above, in some cases, the computerized tool can facilitate such identification via analytical techniques (e.g., via heat transfer modeling). In other cases, however, the computerized tool can facilitate such identification via artificial intelligence techniques. In particular, the computerized tool can execute a deep Q-learning model on the current thermal state and/or on the list of scanning protocols, where the deep Q-learning model can have been trained in reinforcement learning fashion, and where the reward driving such reinforcement learning can be inversely proportional to both the resultant temperatures achieved by the CT scanner and/or the inter-scan cooling times required by the CT scanner. Accordingly, when the computerized tool utilizes such a deep Q-learning model, sequential ordering of scanning protocols can be identified so as to protect the CT scanner from overheating while simultaneously avoiding unnecessarily long inter-scan time delays. Such a computerized tool constitutes a concrete and tangible technique improvement in the field of computed tomography scan sequencing and thus certainly qualifies as a useful and practical application of computers.

Furthermore, various embodiments of the subject innovation can control real-world tangible devices based on the disclosed teachings. For example, various embodiments of the subject innovation can electronically control real-world CT scanners, real-world temperature sensors, and/or real-world neural networks.

It should be appreciated that the herein figures and description provide non-limiting examples of the subject innovation and are not necessarily drawn to scale.

FIG. 1 illustrates a block diagram of an example, non-limiting system 100 that can facilitate thermally adaptive scan sequencing for computed tomography scanners in accordance with one or more embodiments described herein. As shown, a thermally adaptive scan sequencing system 102 can be electronically integrated, via any suitable wired and/or wireless electronic connections, with a computed tomography scanner 104 (hereafter "CT scanner 104") and/or with a scanning protocol roster 106.

In various embodiments, the CT scanner 104 can be any suitable device, equipment, and/or modality that can perform, execute, and/or otherwise implement CT scans and/or CT scanning operations on a medical patient.

In various aspects, the scanning protocol roster 106 can be any suitable electronic data that conveys, includes, and/or lists any suitable number of scanning protocols, each of which can be performable, executable, and/or implementable on and/or via the CT scanner 104. This is explained in more detail with respect to FIGS. 2-3.

Figure 2:
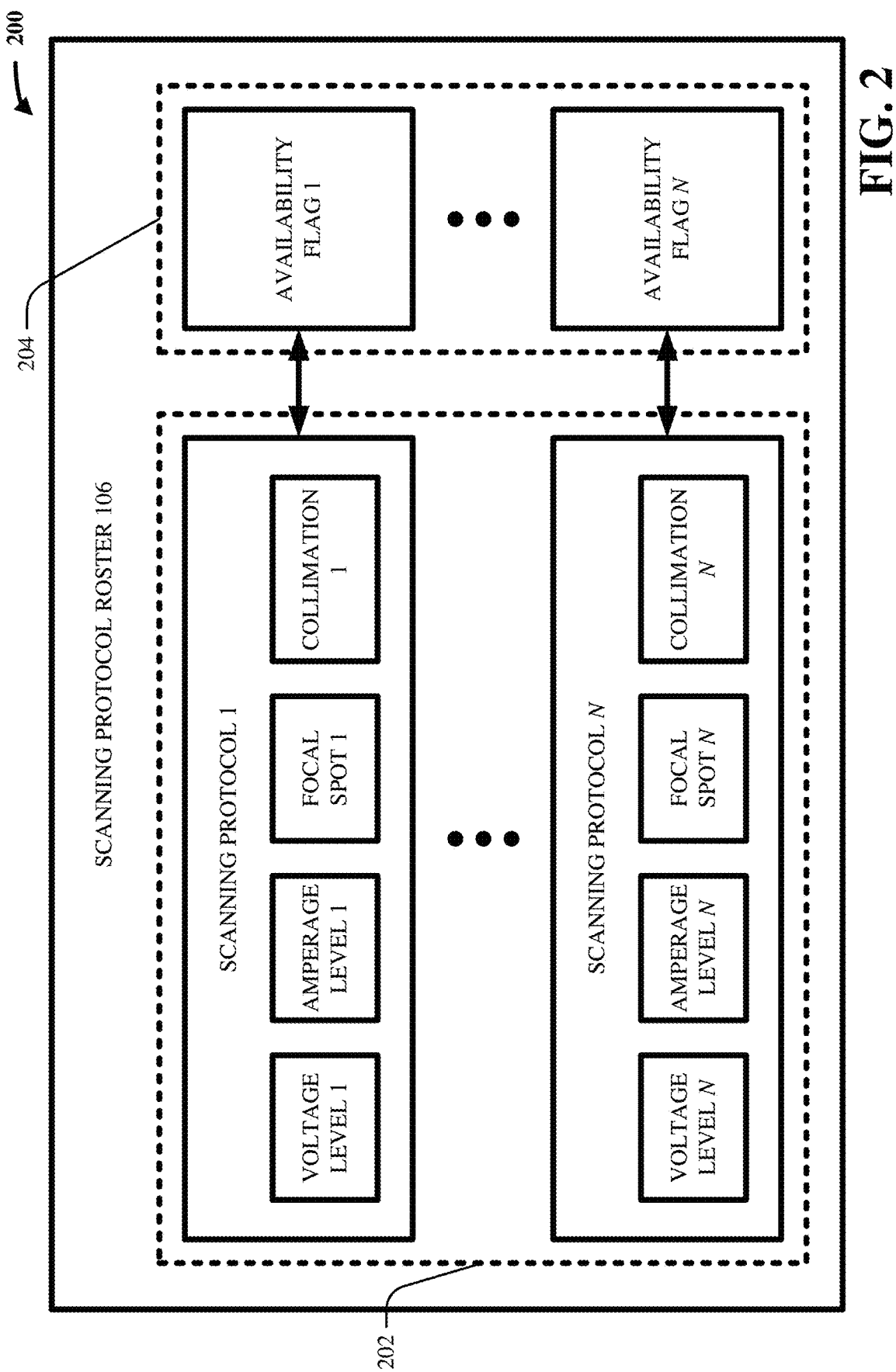
FIG. 2 illustrates an example, non-limiting block diagram of a scanning protocol roster in accordance with one or more embodiments described herein.

FIG. 2 illustrates an example, non-limiting block diagram 200 of a scanning protocol roster in accordance with one or more embodiments described herein. In other words, FIG. 2 shows an example, non-limiting embodiment of the scanning protocol roster 106.

In various embodiments, the scanning protocol roster 106 can include a set of scanning protocols 202 and/or a set of availability flags 204 that respectively correspond to the set of scanning protocols 202. In various aspects, as shown, the set of scanning protocols 202 can include n protocols for any suitable positive integer n: a scanning protocol 1 to a scanning protocol n. In various instances, each of the set of scanning protocols 202 can be a scanning operation that is performable by the CT scanner 104. Accordingly, and as those having ordinary skill in the art will appreciate, each of the set of scanning protocols 202 can be defined by particular configurations of adjustable parameters/settings of the CT scanner 104. For example, in some cases, adjustable parameters/settings of the CT scanner 104 can include a voltage level at which and/or with which the CT scanner 104 executes/performs a scanning operation, an amperage level at which and/or with which the CT scanner 104 executes/performs a scanning operation, a focal spot size at which and/or with which the CT scanner 104 executes/performs a scanning operation, and/or a collimation at which and/or with which the CT scanner 104 executes/performs a scanning operation. Accordingly, each of the set of scanning protocols 202 can be considered as corresponding to a particular voltage level, a particular amperage level, a particular focal spot size, and/or a particular collimation.

For instance, as shown, the scanning protocol 1 can be defined by and/or otherwise correspond to a voltage level 1, an amperage level 1, a focal spot 1, and/or a collimation 1. In other words, the scanning protocol 1 can be performed by activating the CT scanner 104 when the adjustable voltage parameter of the CT scanner 104 is set to the voltage level 1, when the adjustable amperage parameter of the CT scanner 104 is set to the amperage level 1, when the adjustable focal spot size parameter of the CT scanner 104 is set to the focal spot 1, and/or when the adjustable collimation parameter of the CT scanner 104 is set to the collimation 1.

Similarly, as shown, the scanning protocol n can be defined by and/or otherwise correspond to a voltage level n, an amperage level n, a focal spot n, and/or a collimation n. In other words, the scanning protocol n can be performed by activating the CT scanner 104 when the adjustable voltage parameter of the CT scanner 104 is set to the voltage level n, when the adjustable amperage parameter of the CT scanner 104 is set to the amperage level n, when the adjustable focal spot size parameter of the CT scanner 104 is set to the focal spot n, and/or when the adjustable collimation parameter of the CT scanner 104 is set to the collimation n.

Those having ordinary skill in the art will appreciate how different scanning protocols can be implemented by controllably modifying the adjustable parameters/settings of the CT scanner 104 (e.g., by controllably adjusting the voltage, amperage, focal spot, and/or collimation of the CT scanner 104).

In various aspects, the set of availability flags 204 can respectively correspond in one-to-one fashion with the set of scanning protocols 202. Accordingly, since the set of scanning protocols 202 includes n protocols, the set of availability flags 204 can include n flags: an availability flag 1 to an availability flag n. In various instances, each of the set of availability flags 204 can be any suitable electronic data that indicates whether or not a respective scanning protocol is still available for execution by the CT scanner 104. In other words, each of the set of availability flags 204 can indicate whether or not a respective scanning protocol has already been executed a respective threshold number of times by the CT scanner 104.

For example, the availability flag 1 can correspond to the scanning protocol 1. This can mean that the availability flag 1 conveys and/or indicates whether the scanning protocol 1 has already been executed a respective threshold number of times. Thus, if it is desired to execute the scanning protocol 1 for a total of s times, for any suitable positive integer s, then the availability flag 1 can indicate whether or not the CT scanner 104 has already executed/performed the scanning protocol 1 a total of s times. In some instances, the availability flag 1 can be a bit and/or Boolean variable that can take on two possible values (e.g., 0 or 1). In such case, one of such two possible values can indicate that the scanning protocol 1 has already been executed its threshold number of times, while the other of such two possible values can indicate that the scanning protocol 1 has not yet been executed its threshold number of times. In other instances, the availability flag 1 can be an integer-valued counter and/or tally variable that keeps track of the number of times that the scanning protocol 1 has been executed by the CT scanner 104. In such case, if the availability flag 1 is less than s (e.g., the respective threshold number of times that it is desired to execute the scanning protocol 1), it can be inferred that the scanning protocol 1 is still available for execution; however, if the availability flag 1 is instead equal to s, it can be inferred that the scanning protocol 1 is no longer available for execution. In still other instances, the availability flag 1 can be a real-valued counter and/or tally ratio, where the numerator of such ratio indicates the number of times that the scanning protocol 1 has been executed so far, and where the denominator of such ratio indicates the desired number of times that the scanning protocol 1 is to be executed (e.g., the denominator can be s). In such case, if the availability flag 1 is greater than or equal to 0 and less than 1, it can be inferred that the scanning protocol 1 is still available for execution; however, if the availability flag 1 is instead equal to 1, it can be inferred that the scanning protocol 1 is no longer available for execution.

As another example, the availability flag n can correspond to the scanning protocol n. So, the availability flag n can convey and/or indicate whether the scanning protocol n has already been executed a respective threshold number of times. Accordingly, if it is desired to execute the scanning protocol n for a total of t times, for any suitable positive integer t, then the availability flag n can indicate whether or not the CT scanner 104 has already executed/performed the scanning protocol n for a total of t times. In some instances, just as above, the availability flag n can be a bit and/or Boolean variable that can take on two possible values (e.g., one of such two possible values can indicate that the scanning protocol n has already been executed its threshold number of times, while the other of such two possible values can indicate that the scanning protocol n has not yet been executed its threshold number of times). In other instances, the availability flag n can be an integer-valued counter and/or tally variable that keeps track of the number of times that the scanning protocol n has been executed by the CT scanner 104 (e.g., if the availability flag n is less than t, it can be inferred that the scanning protocol n is still available for execution; if the availability flag n is instead equal to t, it can be inferred that the scanning protocol n is no longer available for execution). In still other instances, the availability flag n can be a real-valued counter and/or tally ratio (e.g., the numerator of such ratio can indicate the number of times that the scanning protocol n has been executed so far, and the denominator of such ratio can indicate the desired number of times that the scanning protocol n is to be executed).

As shown in FIG. 2, a scanning protocol can be a single scanning event and/or a single scanning operation that is performable by the CT scanner 104. That is, a scanning protocol can be defined by one voltage-amperage-focal-spot-collimation tuple. However, in other cases, a scanning protocol can be more than one scanning event and/or scanning operation (e.g., can be defined by more than one voltage-amperage-focal-spot-collimation tuple). For example, it can sometimes be desired to perform two or more scanning protocols in a fixed sequence relative to each other. In such case, such two or more scanning protocols can actually be considered and/or treated as collectively forming one large and/or one overall scanning protocol. This is explained in more detail with respect to FIG. 3.

Figure 3:
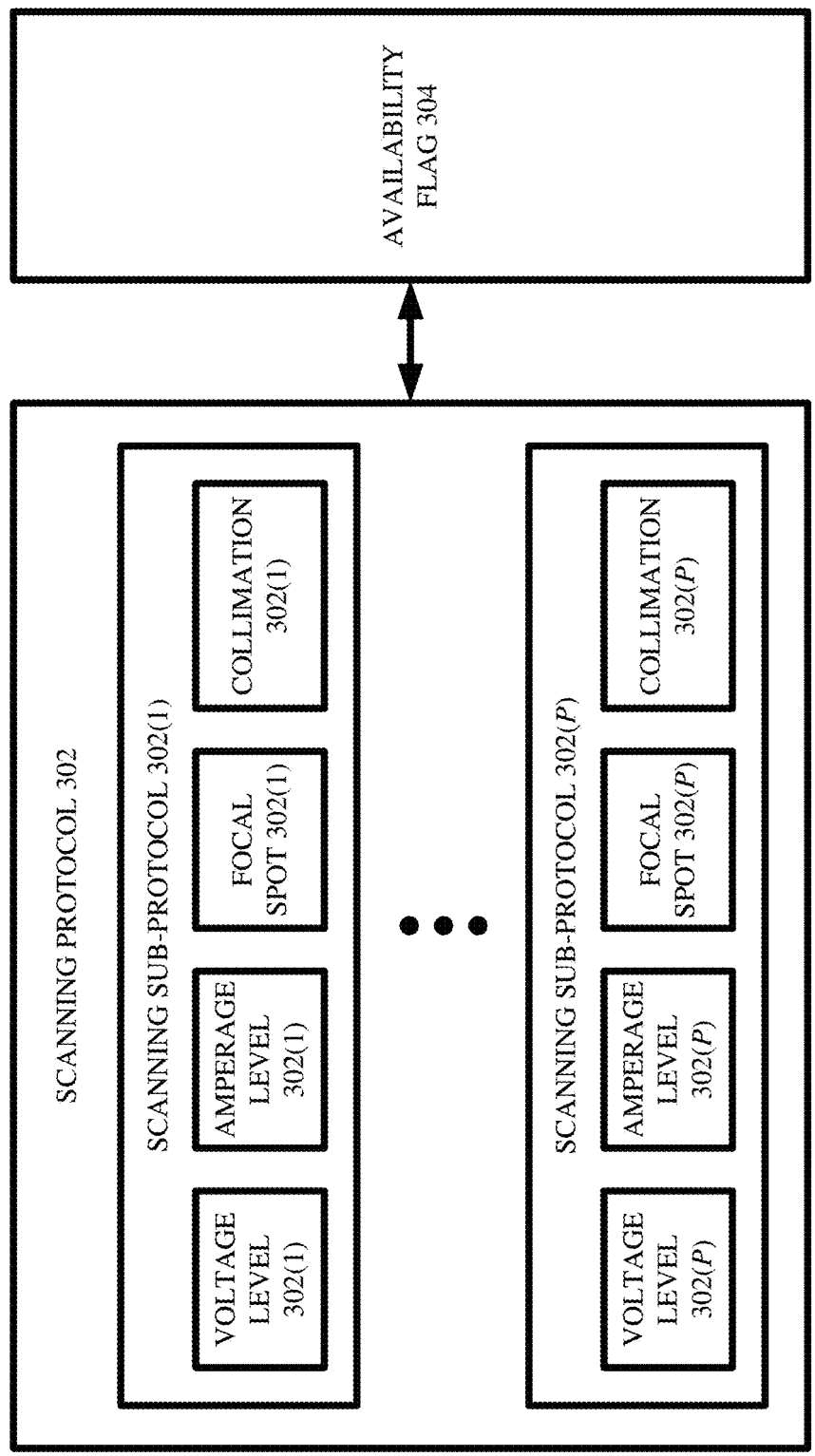
FIG. 3 illustrates an example, non-limiting block diagram of a scanning protocol that includes multiple scanning sub-protocols in accordance with one or more embodiments described herein.

FIG. 3 illustrates an example, non-limiting block diagram 300 of a scanning protocol that includes multiple scanning sub-protocols in accordance with one or more embodiments described herein.

In various embodiments, there can be a scanning protocol 302 that respectively corresponds to an availability flag 304. In various aspects, the scanning protocol 302 can be any of the set of scanning protocols 202, and the availability flag 304 can be a respectively corresponding one of the set of availability flags 204.

As shown, in various instances, the scanning protocol 302 can be made up of multiple scanning sub-protocols that are required to be performed in a fixed, unchangeable sequence relative to each other. In particular, the scanning protocol 302 can include p sub-protocols for any suitable positive integer p: a scanning sub-protocol 302(1) to a scanning sub-protocol 302(p). In various cases, as shown, the scanning sub-protocol 302(1) can correspond to and/or otherwise be defined by a voltage level 302(1), an amperage level 302(1), a focal spot 302(1), and/or a collimation 302(1). That is, the scanning sub-protocol 302(1) can be performed/executed by activating the CT scanner 104 when the voltage parameter of the CT scanner 104 is set to the voltage level 302(1), when the amperage parameter of the CT scanner 104 is set to the amperage level 302(1), when the focal spot parameter of the CT scanner 104 is set to the focal spot 302(1), and/or when the collimation parameter of the CT scanner 104 is set to the collimation 302(1). Likewise, as shown, the scanning sub-protocol 302(p) can correspond to and/or otherwise be defined by a voltage level 302(p), an amperage level 302(p), a focal spot 302(p), and/or a collimation 302(p). That is, the scanning sub-protocol 302(p) can be performed/executed by activating the CT scanner 104 when the voltage parameter of the CT scanner 104 is set to the voltage level 302(p), when the amperage parameter of the CT scanner 104 is set to the amperage level 302(p), when the focal spot parameter of the CT scanner 104 is set to the focal spot 302(p), and/or when the collimation parameter of the CT scanner 104 is set to the collimation 302(p).

In various cases, the scanning sub-protocol 302(1) to the scanning sub-protocol 302(p) can be required to be executed in a fixed, unchangeable order relative to each other. For example, a scanning sub-protocol 302(i) for any suitable positive integer $1 \leq i \leq p$ can be required to be performed i-th out of all the scanning sub-protocols in the scanning protocol 302. Since it can be desired to perform the scanning sub-protocol 302(1) to the scanning sub-protocol 302(p) in such a fixed, unchangeable sequence, none of the scanning sub-protocol 302(1) to the scanning sub-protocol 302(p) can, in various instances, have an individual availability flag. Instead, such fixed, unchangeable sequence of scanning sub-protocols can be collectively considered, treated, and/or referred to as the scanning protocol 302 (e.g., as one unchangeable block of scanning sub-protocols), and the scanning protocol 302 can have one overall availability flag (e.g., the availability flag 304).

As those having ordinary skill in the art will appreciate, any of the set of scanning protocols 202 can exhibit the sub-protocol structure depicted in FIG. 3.

Referring back to FIG. 1, it can be desired to execute all of the scanning protocol roster 106 on and/or via the CT scanner 104. However, it can be further desired to execute the scanning protocol roster 106 in a sequential order that reduces overall thermal stress experienced by the CT scanner 104. That is, unlike the relative order of execution of the scanning sub-protocol 302(1) to the scanning sub-protocol 302($p$), the relative order of execution of the scanning protocol 1 to the scanning protocol n can be not fixed (e.g., a scanning protocol j for any suitable positive integer $1 \leq j \leq n$ can be executed in some position other than j-th out of all of the set of scanning protocols 202). Indeed, as recognized by the present inventors, it can be the case that the thermal stress (e.g., the maximum and/or average temperature) experienced by the CT scanner 104 due to execution of the scanning protocol roster 106 depends upon the order in which the CT scanner 104 sequentially executes the scanning protocol roster 106. This is explained in more detail with respect to FIGS. 4-8.

FIGS. 4-8 illustrate example, non-limiting scan sequences in accordance with one or more embodiments described herein. For purposes of illustration, suppose that the scanning protocol roster 106 includes five scanning protocols, denoted as $P_1$, $P_2$, $P_3$, $P_4$, and $P_5$ (e.g., suppose that n=5). Furthermore, for ease of illustration and explanation, suppose that it is desired to execute each of $P_1$, $P_2$, $P_3$, $P_4$, and $P_5$ exactly once. In various instances, FIGS. 4-7 depict different orders in which such five scanning protocols can be executed exactly once each.

Figure 4:
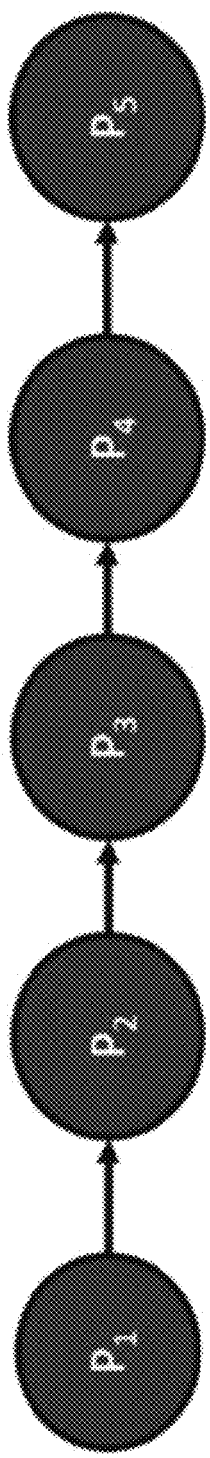
FIGS. 4-8 illustrate example, non-limiting scanning sequences in accordance with one or more embodiments described herein.

FIG. 4 illustrates a sequence 400. As can be seen in the sequence 400, $P_1$ is executed first, $P_2$ is executed second, $P_3$ is executed third, $P_4$ is executed fourth, and $P_5$ is executed fifth.

Figure 5:
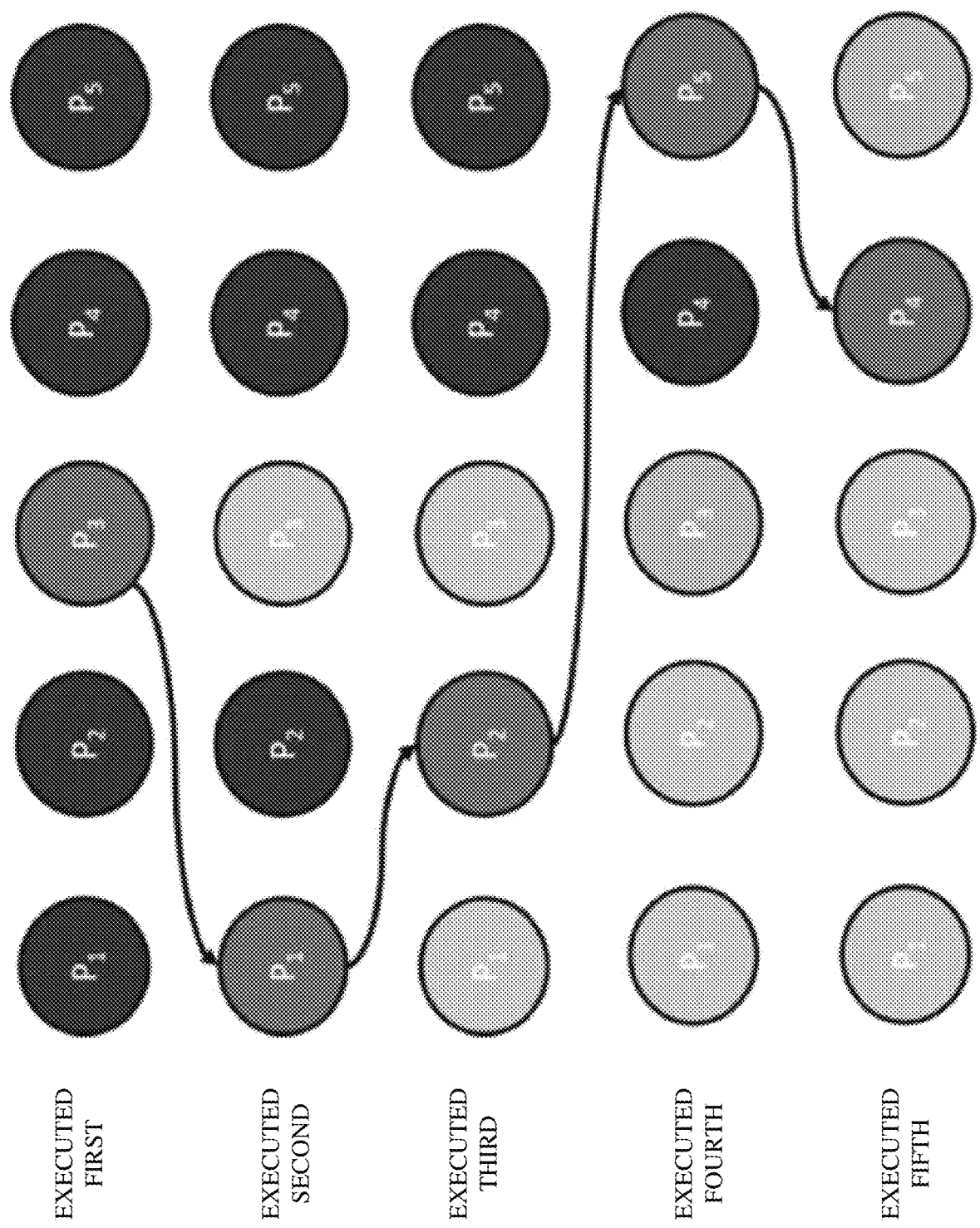

FIG. 5 illustrates a sequence 500. In FIG. 5, the color blue can indicate an available scanning protocol (e.g., a scanning protocol that has not yet been executed once), the color gray can indicate an unavailable scanning protocol (e.g., a scanning protocol that has already been executed once), and the color green can indicate a scanning protocol that is selected to be executed. As can be seen in the sequence 500, $P_3$ is executed first (e.g., when $P_1$, $P_2$, $P_3$, $P_4$, and $P_5$ are available), $P_1$ is executed second (e.g., when $P_1$, $P_2$, $P_4$, and $P_5$ are available), $P_2$ is executed third (e.g., when $P_2$, $P_4$, and $P_5$ are available), $P_5$ is executed fourth (e.g., when $P_4$ and $P_5$ are available), and $P_4$ is executed fifth (e.g., when only $P_4$ is available).

Figure 6:
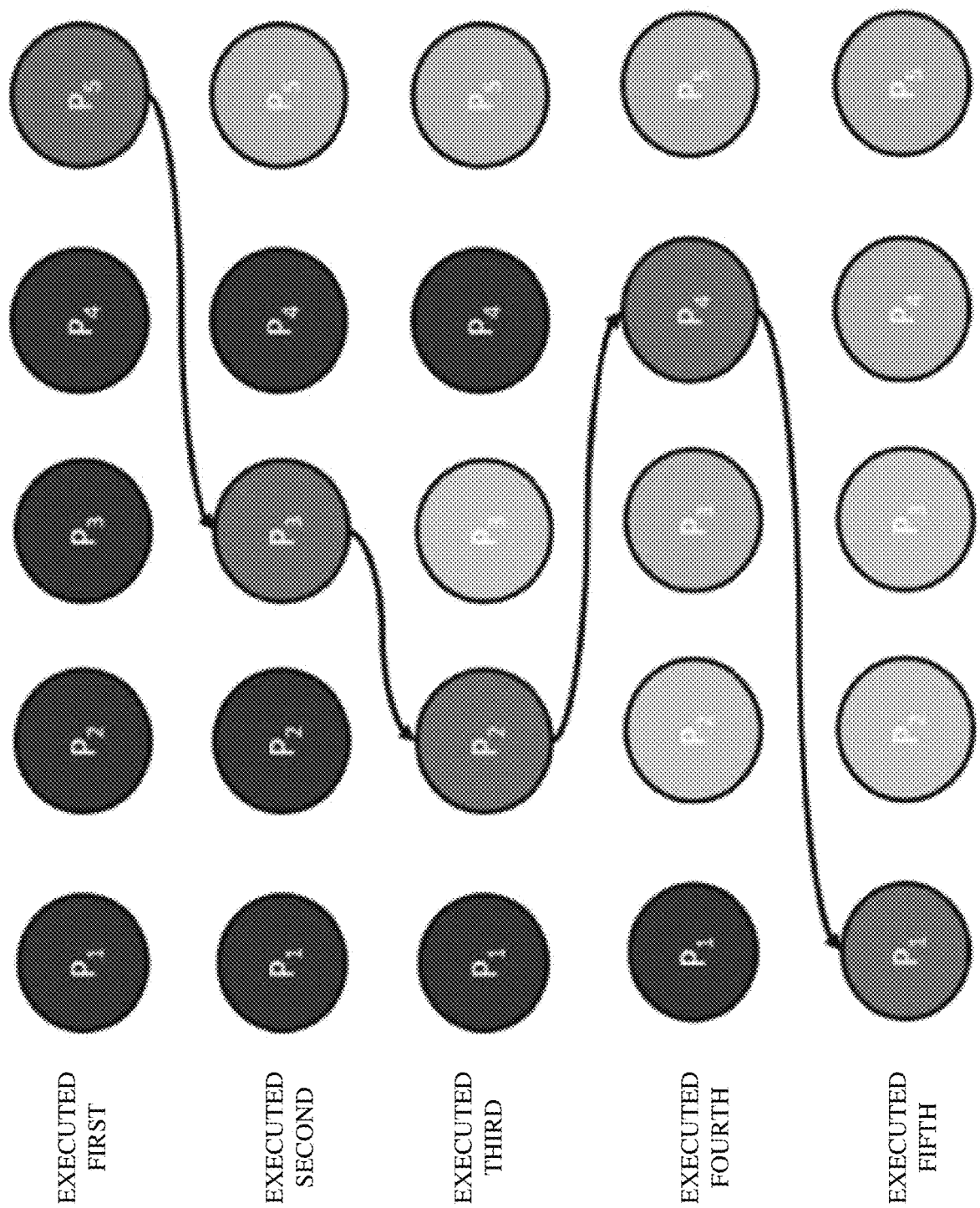

FIG. 6 illustrates a sequence 600. Just as above, the color blue in FIG. 6 can indicate an available scanning protocol (e.g., a scanning protocol that has not yet been executed once), the color gray in FIG. 6 can indicate an unavailable scanning protocol (e.g., a scanning protocol that has already been executed once), and the color green in FIG. 6 can indicate a scanning protocol that is selected to be executed. As can be seen in the sequence 600, $P_5$ is executed first (e.g., when $P_1$, $P_2$, $P_3$, $P_4$, and $P_5$ are available), $P_3$ is executed second (e.g., when $P_1$, $P_2$, $P_3$, and $P_4$ are available), $P_2$ is executed third (e.g., when $P_1$, $P_2$, and $P_4$ are available), $P_4$ is executed fourth (e.g., when $P_1$ and $P_4$ are available), and $P_1$ is executed fifth (e.g., when only $P_1$ is available).

Figure 7:
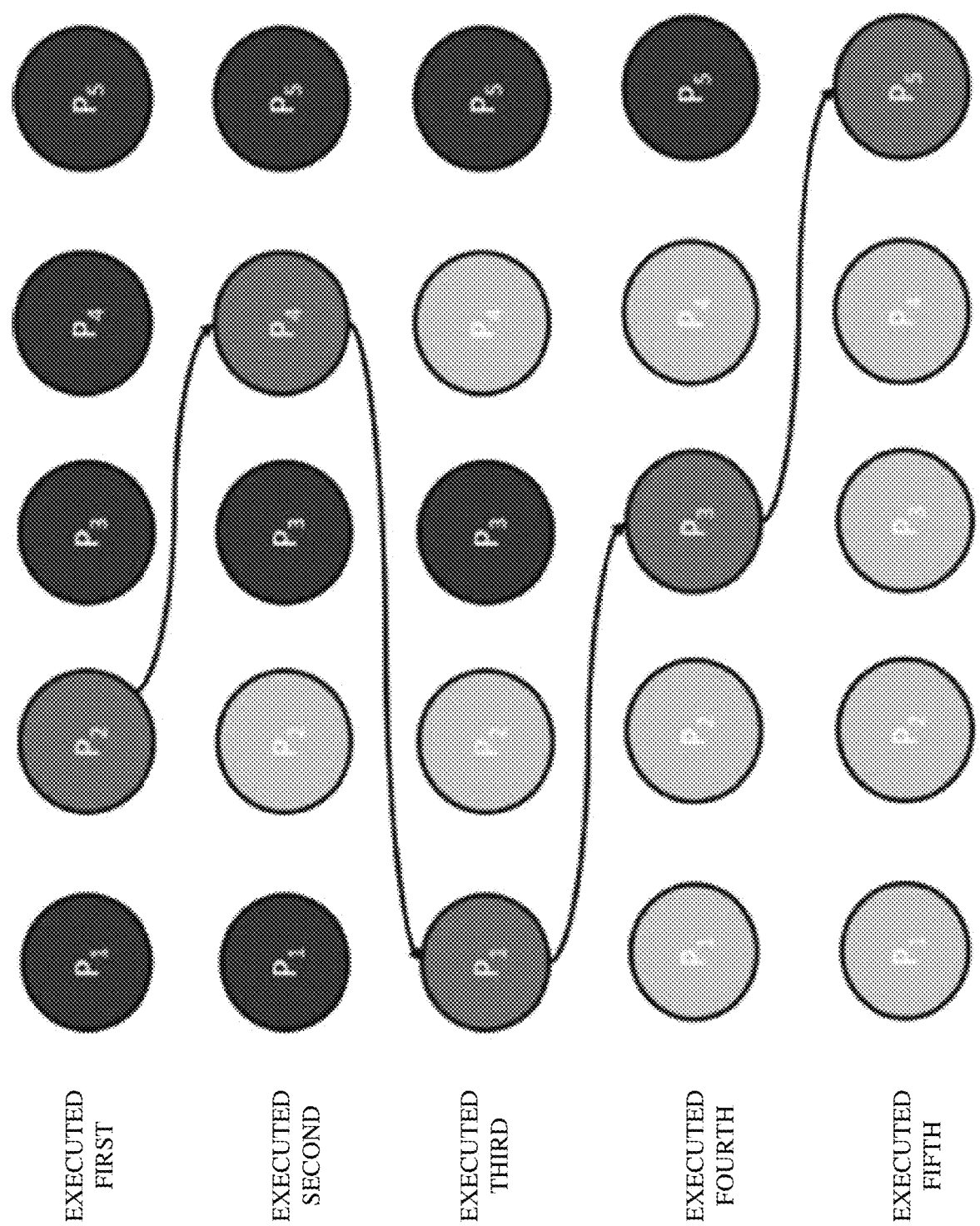
Figure 8:
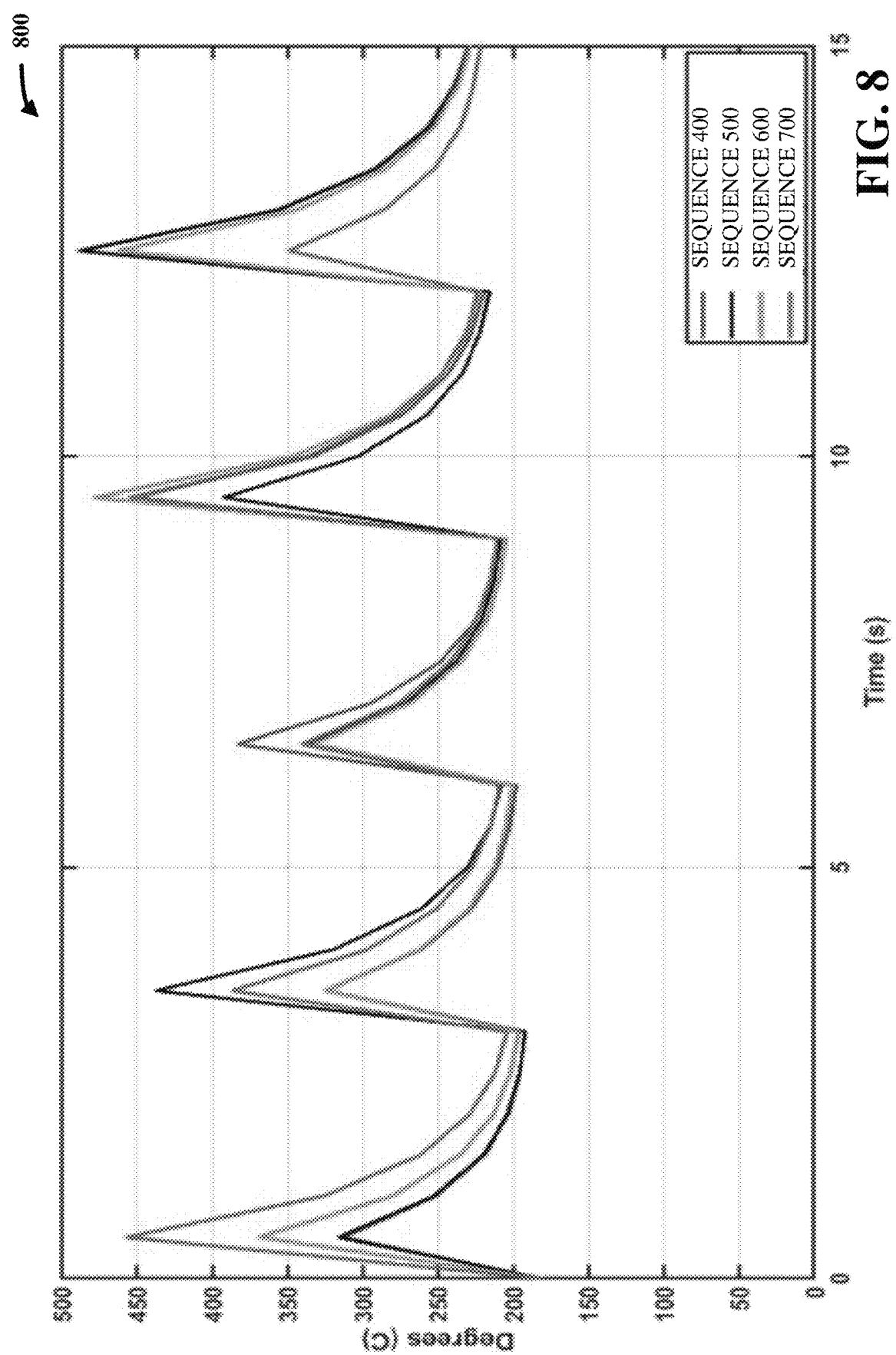

FIG. 7 illustrates a sequence 700. Just as above, the color blue can indicate an available scanning protocol (e.g., a scanning protocol that has not yet been executed once), the color gray can indicate an unavailable scanning protocol (e.g., a scanning protocol that has already been executed once), and the color green can indicate a scanning protocol that is selected to be executed. As can be seen in the sequence 700, $P_2$ is executed first (e.g., when $P_1$, $P_2$, $P_3$, $P_4$, and $P_5$ are available), $P_4$ is executed second (e.g., when $P_1$, $P_3$, $P_4$, and $P_5$ are available), $P_1$ is executed third (e.g., when $P_1$, $P_3$, and $P_5$ are available), $P_3$ is executed fourth (e.g., when $P_3$ and $P_5$ are available), and $P_5$ is executed fifth (e.g., when only $P_5$ is available).

Note that the only different across FIGS. 4-7 is the order in which the five scanning protocols $P_1$, $P_2$, $P_3$, $P_4$, and $P_5$ are executed. That is, no changes in the voltage levels, amperage levels, focal spot sizes, and/or collimations of the five scanning protocols $P_1$, $P_2$, $P_3$, $P_4$, and $P_5$ are made across FIGS. 4-7. Moreover, no changes in inter-scan time delays are made across FIGS. 4-7.

In various aspects, the present inventors experimentally implemented on a real-world CT scanner the sequences 400-700 with five unique real-world scanning protocols. For each of the sequences 400-700, the present inventors measured the temperature of an X-ray tube of the CT scanner, and the present inventors plotted the results in a graph 800, shown in FIG. 8. Again, the only change made by the present inventors during such experiment was order of execution of the five unique scanning protocols. No changes at all were made to the voltage, amperage, focal spot, and/or collimation characteristics of the five unique scanning protocols. Furthermore, no changes at all were made to the inter-scan time delays. Indeed, no matter the sequence used, the present inventors inserted a uniform time delay between all successive scanning protocols during such experiment.

As shown in the graph 800, the temperature profile of the X-ray tube temporally varies based on the sequence and/or order of execution of the five unique scanning protocols. Not only does the temperature profile of the X-ray tube temporally vary with the sequence and/or order of execution, but the maximum temperature achieved by the X-ray tube varies with the sequence and/or order of execution, as well. Indeed, for the sequence 400, the present inventors recorded a maximum X-ray tube temperature of 490 degrees Celsius; for the sequence 500, the present inventors recorded a maximum X-ray tube temperature of 487 degrees Celsius; for the sequence 600, the present inventors recorded a maximum X-ray tube temperature of 477 degrees Celsius; and for the sequence 700, the present inventors recorded a maximum X-ray tube temperature of 456 degrees Celsius. Accordingly, these experimental results show that the order in which scanning protocols are sequentially executed can significantly affect the accumulation of thermal stress (e.g., the maximum and/or average temperature) experienced by a CT scanner.

Returning back to FIG. 1, and as mentioned above, it can be desired to identify which order the scanning protocol roster 106 should be sequentially executed in, so as to reduce overall thermal stress experienced by the CT scanner 104. As described herein, the thermally adaptive scan sequencing system 102 can identify and/or implement such a sequential order of execution for the scanning protocol roster 106.

In various embodiments, the thermally adaptive scan sequencing system 102 can comprise a processor 108 (e.g., computer processing unit, microprocessor) and a computer-readable memory 110 that is operably and/or operatively and/or communicatively connected/coupled to the processor 108. The computer-readable memory 110 can store computer-executable instructions which, upon execution by the processor 108, can cause the processor 108 and/or other components of the thermally adaptive scan sequencing system 102 (e.g., receiver component 112, thermal component 114, analysis component 116, execution component 118) to perform one or more acts. In various embodiments, the computer-readable memory 110 can store computer-executable components (e.g., receiver component 112, thermal component 114, analysis component 116, execution component 118), and the processor 108 can execute the computer-executable components.

In various embodiments, the thermally adaptive scan sequencing system 102 can comprise a receiver component 112. In various aspects, the receiver component 112 can electronically receive and/or otherwise electronically access the scanning protocol roster 106. In various instances, the receiver component 112 can electronically retrieve the scanning protocol roster 106 from any suitable centralized and/or decentralized data structure (not shown). In any case, the receiver component 112 can electronically obtain and/or access the scanning protocol roster 106, such that other components of the thermally adaptive scan sequencing system 102 can electronically interact with the scanning protocol roster 106.

In various embodiments, the thermally adaptive scan sequencing system 102 can comprise a thermal component 114. In various aspects, as described herein, the thermal component 114 can electronically access a current thermal state of the CT scanner 104.

In various embodiments, the thermally adaptive scan sequencing system 102 can comprise an analysis component 116. In various instances, as described herein, the analysis component 116 can electronically select and/or choose a scanning protocol from the scanning protocol roster 106, based on the current thermal state. In some cases, the analysis component 116 can perform this selection analytically. In other cases, the analysis component 116 can perform this selection via artificial intelligence.

In various embodiments, the thermally adaptive scan sequencing system 102 can comprise an execution component 118. In various cases, as described herein, the execution component 118 can electronically cause the CT scanner 104 to execute and/or perform the scanning protocol that is selected by the analysis component 116. Furthermore, in various aspects, the execution component 118 can update an availability flag of the scanning protocol that is selected by the analysis component 116.

Figure 9:
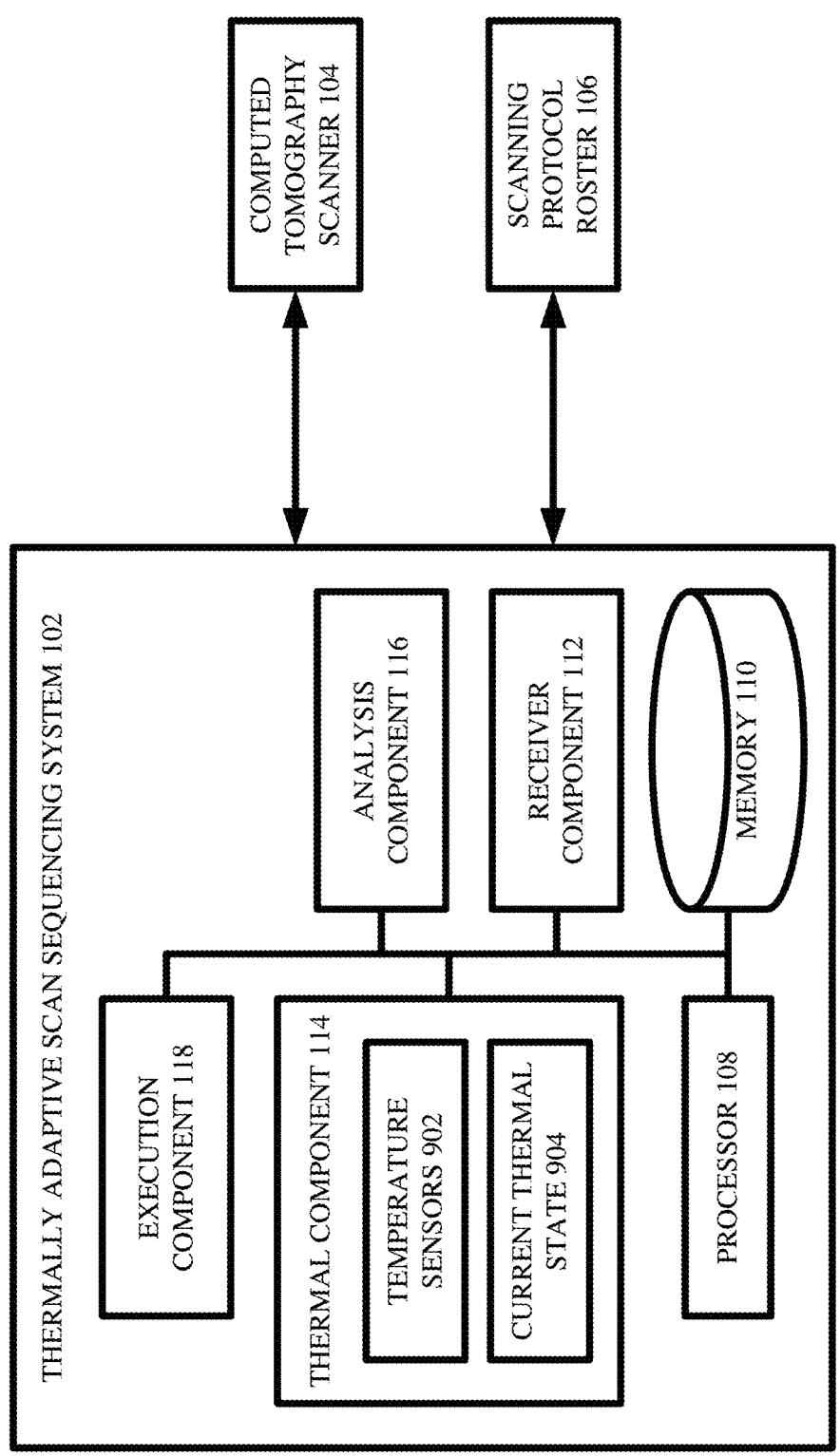
FIG. 9 illustrates a block diagram of an example, non-limiting system including a set of temperature sensors and a current thermal state that facilitates thermally adaptive scan sequencing for computed tomography scanners in accordance with one or more embodiments described herein.

FIG. 9 illustrates a block diagram of an example, non-limiting system 900 including a set of temperature sensors and a current thermal state that can facilitate thermally adaptive scan sequencing for computed tomography scanners in accordance with one or more embodiments described herein. As shown, the system 900 can, in some cases, comprise the same components as the system 100, and can further comprise a set of temperature sensors 902 and/or a current thermal state 904.

In various embodiments, the thermal component 114 can electronically communicate with and/or otherwise electronically control the set of temperature sensors 902, and the set of temperature sensors 902 can be integrated into and/or otherwise coupled to the CT scanner 104. Accordingly, in various instances, the thermal component 114 can electronically leverage the set of temperature sensors 902 to measure, detect, and/or otherwise record one or more temperatures associated with the CT scanner 104, and such one or more temperatures can be considered as collectively forming the current thermal state 904. This is explained in more detail with respect to FIG. 10.

Figure 10:
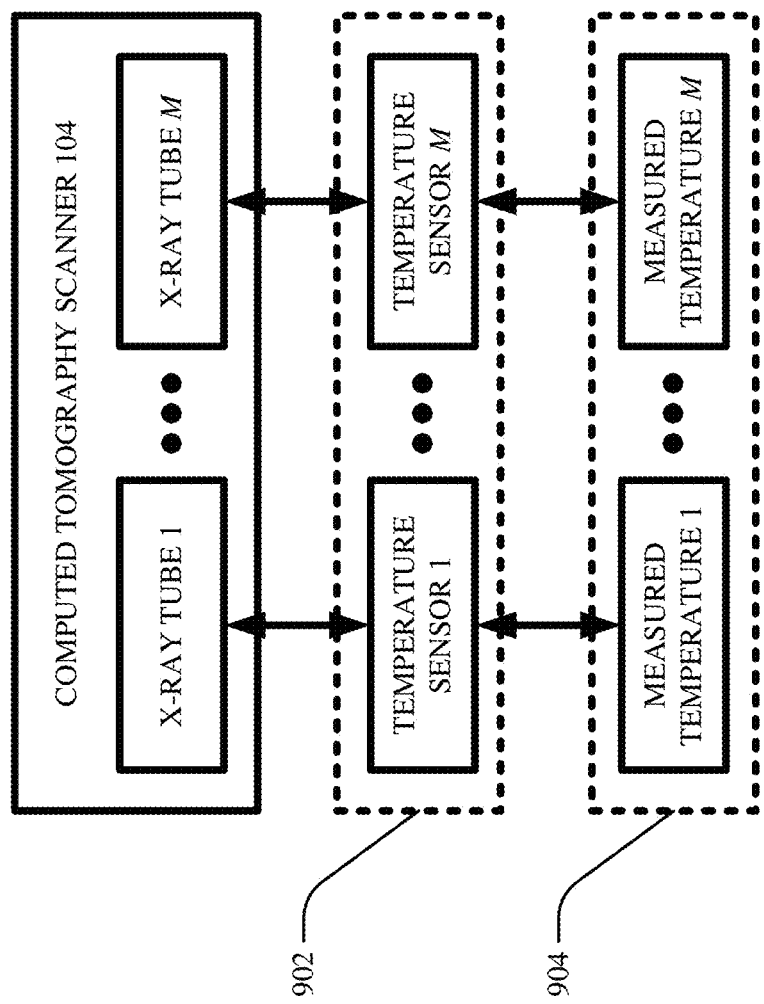
FIG. 10 illustrates an example, non-limiting block diagram showing how a thermal state can be acquired from a computed tomography scanner in accordance with one or more embodiments described herein.

FIG. 10 illustrates an example, non-limiting block diagram 1000 showing how the current thermal state 904 can be acquired from the CT scanner 104 in accordance with one or more embodiments described herein.

As shown, the CT scanner 104 can, in various aspects, include m X-ray tubes, for any suitable positive integer m: an X-ray tube 1 to an X-ray tube m. In various instances, the set of temperature sensors 902 can respectively correspond to such m X-ray tubes. Accordingly, in various cases, the set of temperature sensors 902 can include m sensors: a temperature sensor 1 to a temperature sensor m. In various aspects, the temperature sensor 1 can correspond to the X-ray tube 1. That is, the temperature sensor 1 can be any suitable type of temperature measurement device (e.g., thermometer, thermistor) that can be coupled to and/or that can otherwise interact with the X-ray tube 1, such that the temperature sensor 1 can measure and/or detect (e.g., in Celsius, Fahrenheit, Kelvin, or Rankine) a temperature of the X-ray tube 1. In various cases, such measured/detected temperature of the X-ray tube 1 can be referred to as a measured temperature 1. Likewise, in various instances, the temperature sensor m can correspond to the X-ray tube m. In other words, the temperature sensor m can be any suitable type of temperature measurement device (e.g., thermometer, thermistor) that can be coupled to and/or that can otherwise interact with the X-ray tube m, such that the temperature sensor m can measure and/or detect (e.g., in Celsius, Fahrenheit, Kelvin, or Rankine) a temperature of the X-ray tube m. In various cases, such measured/detected temperature of the X-ray tube m can be referred to as a measured temperature m. In any case, the measured temperature 1 to the measured temperature m can be collectively considered as the current thermal state 904 (e.g., can be considered as describing the current thermal characteristics of the CT scanner 104).

Note that, since each measured temperature can be a real-valued scalar, the current thermal state 904 that is depicted in FIG. 10 can be considered as a row vector and/or as a column vector having m scalar elements. However, this is a mere non-limiting example. In various embodiments, the current thermal state 904 can have any other suitable format and/or dimensionality as desired, depending upon the number of X-ray tubes in the CT scanner 104 and/or depending upon the number of sensors in the set of temperature sensors 902. For example, in some cases, the current thermal state 904 can be a scalar (e.g., can represent one measured temperature value of one X-ray tube of the CT scanner 104). As another example, in some cases, the current thermal state 904 can be a row vector and/or a column vector of scalars (e.g., can represent one measured temperature value for each of multiple X-ray tubes of the CT scanner 104, as shown in FIG. 10; or can represent multiple measured temperature values of only one X-ray tube of the CT scanner 104). As still another example, in some cases, the current thermal state 904 can be a matrix and/or a tensor of scalars (e.g., can represent multiple measured temperature values for each of multiple X-ray tubes of the CT scanner 104).

In any case, the current thermal state 904 can be considered as representing the thermal characteristics and/or the thermal behavior that the CT scanner 104 is currently exhibiting, and the thermal component 114 can electronically access, receive, measure, and/or detect the current thermal state 904 via the set of temperature sensors 902.

Although the herein disclosure mainly describes various embodiments of the subject innovation as utilizing temperature sensors (e.g., 902) to access and/or determine the current thermal state 904, this is a mere non-limiting example. In various embodiments, the current thermal state 904 can be accessed in any suitable fashion as desired. For example, in some cases, the thermal component 114 can electronically estimate and/or compute the current thermal state 904 by leveraging any suitable thermal modeling techniques (e.g., thermodynamics formulas, heat transfer equations), without requiring the set of temperature sensors 902.

Figure 11:
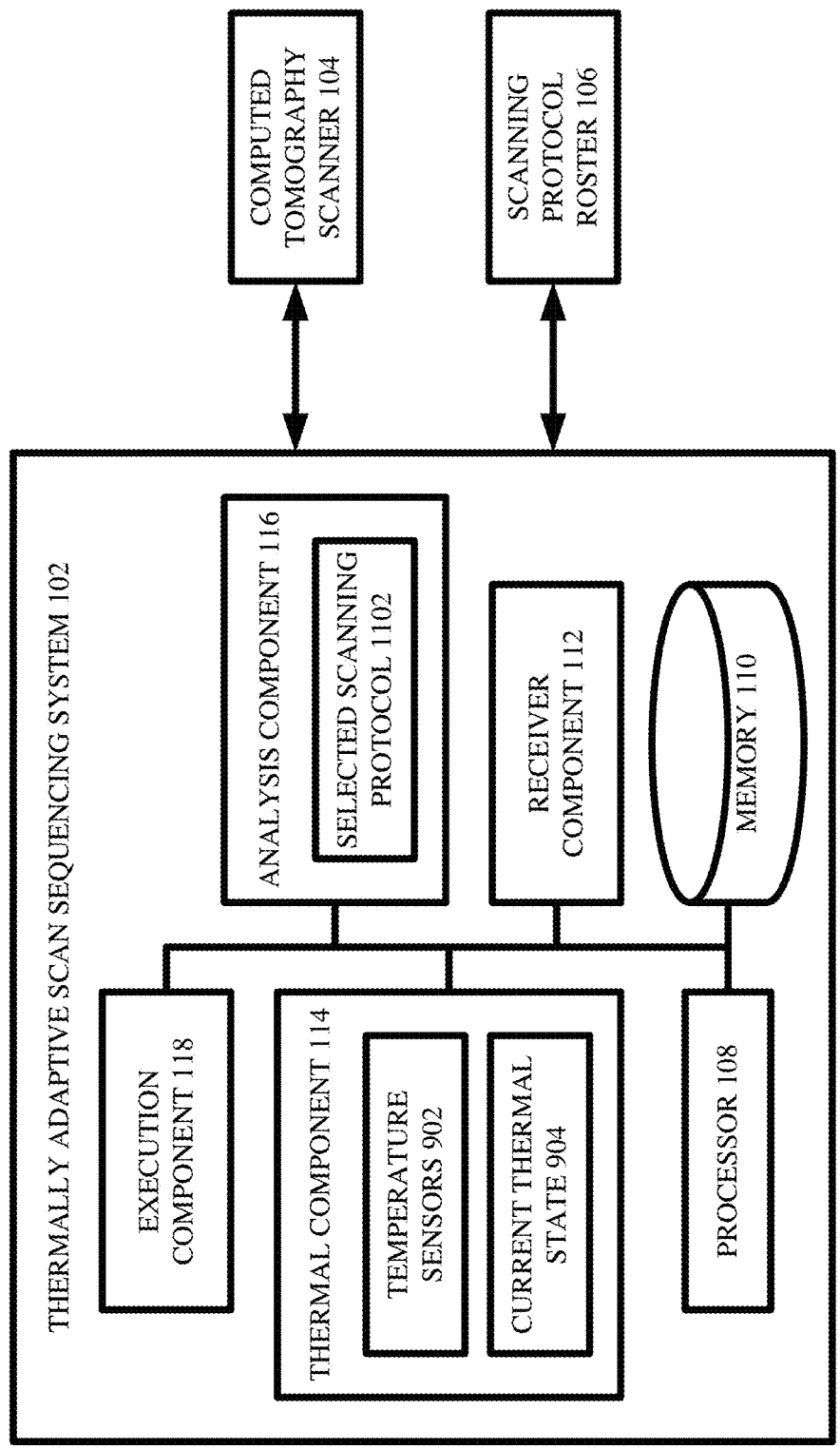
FIG. 11 illustrates a block diagram of an example, non-limiting system including a selected scanning protocol that facilitates thermally adaptive scan sequencing for computed tomography scanners in accordance with one or more embodiments described herein.

FIG. 11 illustrates a block diagram of an example, non-limiting system 1100 including a selected scanning protocol that can facilitate thermally adaptive scan sequencing for computed tomography scanners in accordance with one or more embodiments described herein. As shown, the system 1100 can, in some cases, comprise the same components as the system 900, and can further comprise a selected scanning protocol 1102.

In various embodiments, the analysis component 116 can electronically choose, from the scanning protocol roster 106, a particular scanning protocol, based on the current thermal state 904. More specifically, the analysis component 116 can electronically choose that scanning protocol which the analysis component 116 believes and/or concludes would best help to reduce overall thermal stress of the CT scanner 104. In various cases, such chosen scanning protocol can be referred to as the selected scanning protocol 1102. In various instances, the analysis component 116 can implement analytical techniques and/or artificial intelligence techniques to identify the selected scanning protocol 1102. This is explained in more detail with respect to FIG. 12.

Figure 12:
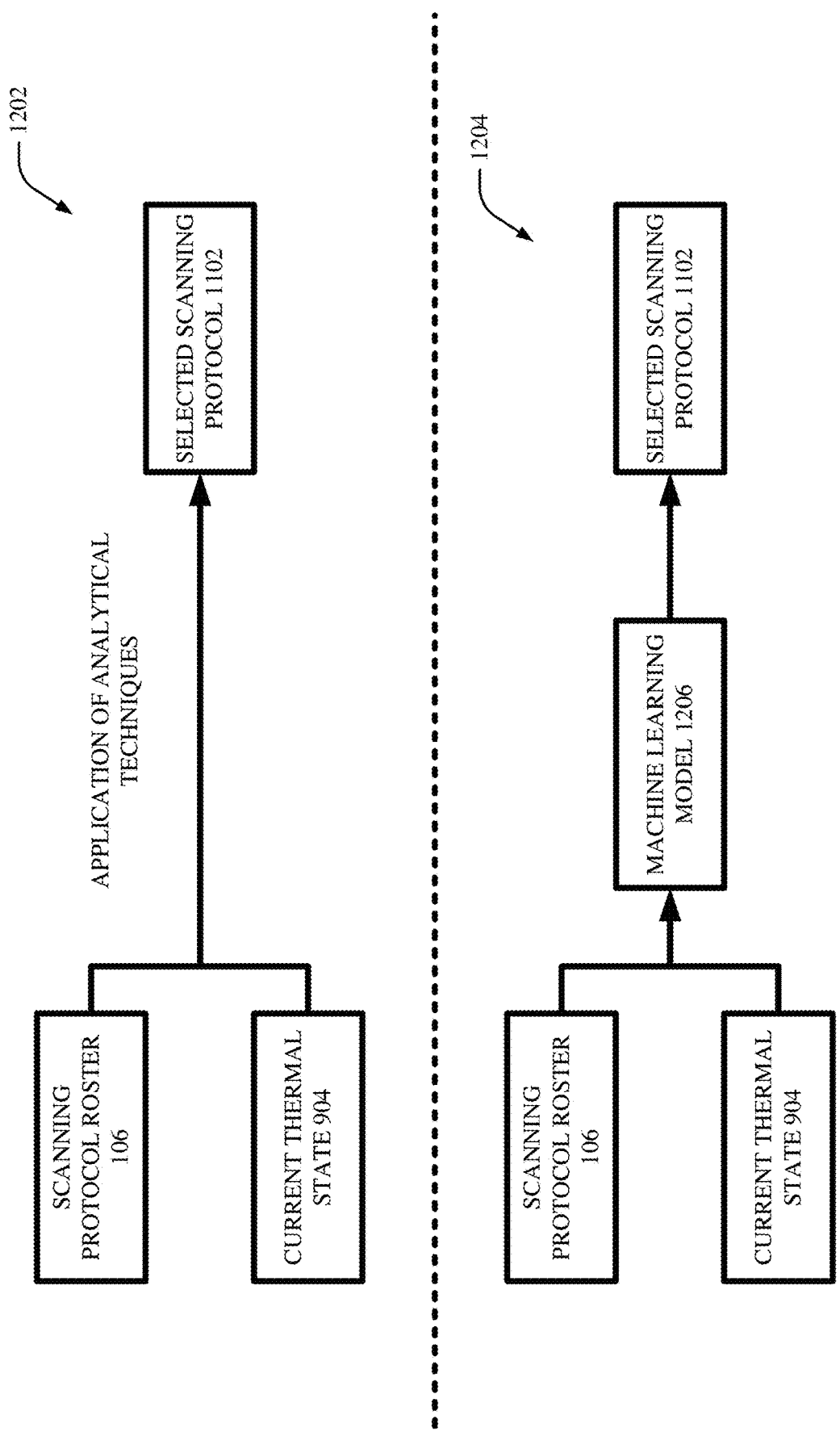
FIG. 12 illustrates an example, non-limiting block diagram showing how a selected scanning protocol can be chosen based on a thermal state in accordance with one or more embodiments described herein.

FIG. 12 illustrates an example, non-limiting block diagram showing how the selected scanning protocol 1102 can be chosen from the scanning protocol roster 106 based on the current thermal state 904 in accordance with one or more embodiments described herein. As shown, FIG. 12 depicts two scenarios: a scenario 1202 and a scenario 1204.

In various embodiments, as shown in the scenario 1202, the analysis component 116 can electronically identify the selected scanning protocol 1102 by applying any suitable analytical techniques to the scanning protocol roster 106 and/or to the current thermal state 904. More specifically, the analysis component 116 can electronically iterate through each scanning protocol (e.g., through each of 202) in the scanning protocol roster 106. For any given scanning protocol that is under consideration, the analysis component 116 can examine the availability flag (e.g., one of 204) that corresponds to that given scanning protocol. If the availability flag indicates that the given scanning protocol is no longer available (e.g., if the availability flag indicates that the given scanning protocol has already been executed its respective threshold number of times), then the analysis component 116 can cease considering the given scanning protocol and can iterate to a next scanning protocol in the scanning protocol roster 106. On the other hand, if the availability flag instead indicates that the given scanning protocol is still available (e.g., if the availability flag indicates that the given scanning protocol has not yet been executed its respective threshold number of times), then the analysis component 116 can electronically predict and/or estimate a resultant thermal state that the CT scanner 104 would achieve if the given scanning protocol were to be executed next. More specifically, the analysis component 116 can facilitate such prediction/estimation by leveraging the current thermal state 904, by leveraging any known characteristics (e.g., voltage level, amperage level, focal spot size, collimation) of the given scanning protocol that are specified in the scanning protocol roster 106, and/or by leveraging any suitable heat transfer formulas and/or thermodynamics equations for modeling heat generation and/or heat dissipation. Furthermore, in some cases, the analysis component 116 can utilize any suitable heat transfer formulas and/or thermodynamics equations to predict/estimate how long it would take for the resultant thermal state to cool down to any suitable threshold thermal state as desired. In various cases, the analysis component 116 can then cease considering the given scanning protocol and can iterate to a next scanning protocol in the scanning protocol roster 106. In various aspects, once the analysis component 116 has predicted/estimated a resultant thermal state and/or a cool-down time for each still-available scanning protocol in the scanning protocol roster 106, the analysis component 116 can choose as the selected scanning protocol 1102 whichever scanning protocol has the most desirable resultant thermal state and/or the most desirable cool-down time (e.g., whichever scanning protocol has the least-hot resultant thermal state and/or the quickest/shortest cool-down time).

In various other embodiments, as shown in the scenario 1204, the analysis component 116 can electronically identify the selected scanning protocol 1102 by executing a machine learning model 1206 on the scanning protocol roster 106 and/or on the current thermal state 904. In such case, the analysis component 116 can electronically store, electronically maintain, electronically control, and/or otherwise electronically access the machine learning model 1206. In various aspects, the machine learning model 1206 can have any suitable artificial intelligence architecture as desired. For example, the machine learning model 1206 can be a deep learning neural network (e.g., a deep Q-learning network) that can have any suitable number of layers, any suitable numbers of neurons in various layers, any suitable activation functions in various neurons, and/or any suitable interneuron connectivity patterns. In various instances, the machine learning model 1206 can be configured to receive as input both the scanning protocol roster 106 and/or the current thermal state 904, and the machine learning model 1206 can be further configured to produce as output the selected scanning protocol 1102 (e.g., to produce as output an indication of the selected scanning protocol 1102). More specifically, as mentioned above, the current thermal state 904 can be represented as one or more first scalars, vectors, matrices, and/or tensors. Similarly, in various cases, the scanning protocol roster 106 (e.g., the scanning protocols, their availability flags, and/or their corresponding voltage, amperage, focal spot, and/or collimation properties) can be represented as one or more second scalars, vectors, matrices, tensors, and/or character strings. In various aspects, such one or more first scalars, vectors, matrices, and/or tensors can be concatenated with such one or more second scalars, vectors, matrices, tensors, and/or character strings. Furthermore, in various instances, an input layer of the machine learning model 1206 can receive such concatenation, such concatenation can undergo a forward pass through one or more hidden layers of the machine learning model 1206, and/or an output layer of the machine learning model 1206 can compute the indication of the selected scanning protocol 1102 (e.g., can identify the selected scanning protocol 1102), based on activation maps yielded by the one or more hidden layers. In various cases, if the machine learning model 1206 is a deep Q-learning network, then the output layer of the machine learning model 1206 can compute a Q-value for each still-available scanning protocol in the scanning protocol roster 106, and whichever scanning protocol has the highest Q-value can be considered as being the selected scanning protocol 1102. In various aspects, because the selected scanning protocol 1102 can have the highest Q-value, the selected scanning protocol 1102 can be considered as that scanning protocol in the scanning protocol roster 106 that is still-available and that is predicted and/or inferred by the machine learning model 1206 to best help reduce the overall thermal stresses experienced by the CT scanner 104 when given the current thermal state 904.

In order for the machine learning model 1206 to be able to accurately predict which still-available scanning protocol is best able to help reduce the total thermal stresses experienced by the CT scanner 104, the machine learning model 1206 should first undergo training. Such training is explained in more detail with respect to FIGS. 15-19.

In any case, the analysis component 116 can electronically identify the selected scanning protocol 1102, based on the current thermal state 904 and/or based on the scanning protocol roster 106.

Figure 13:
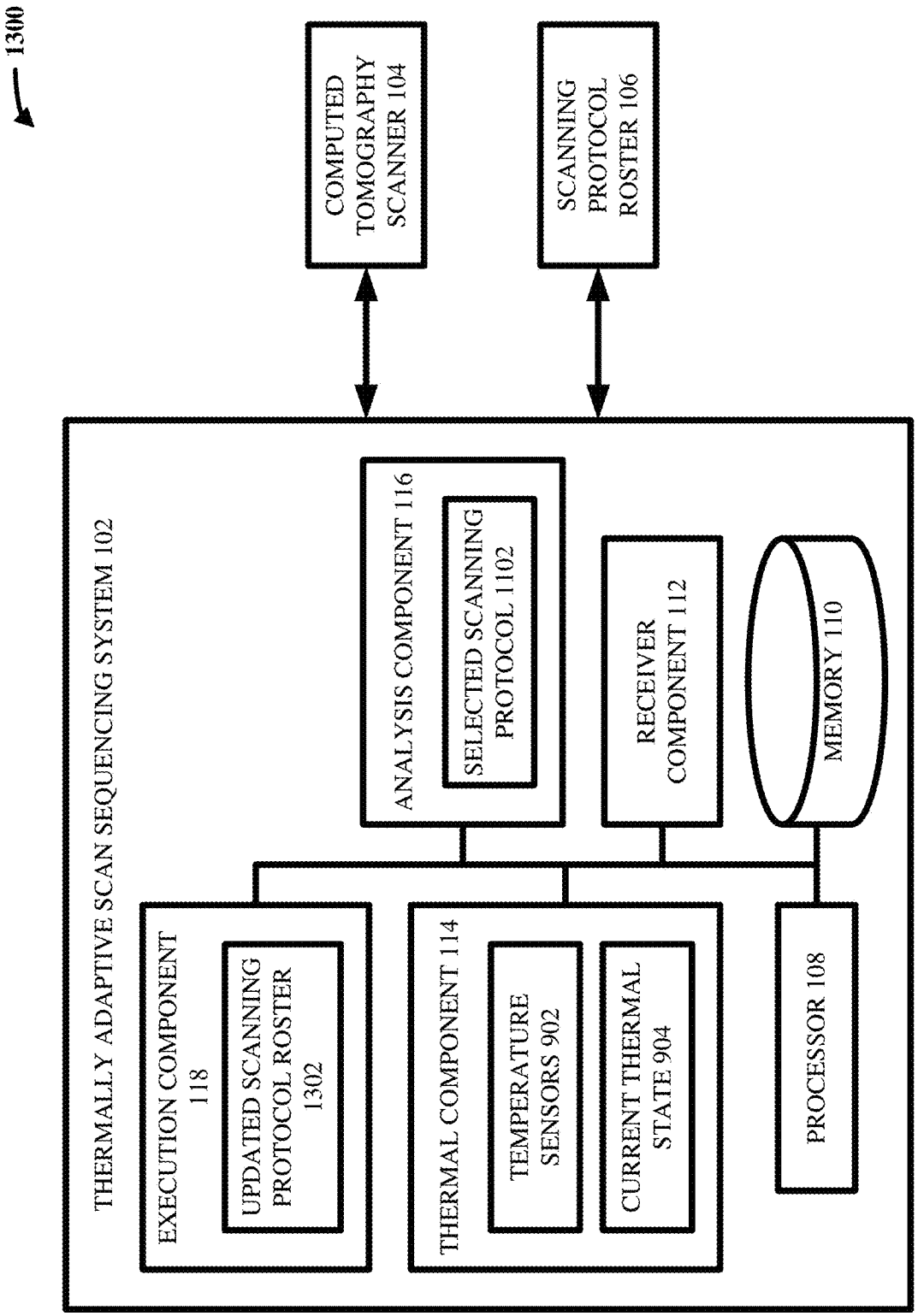
FIG. 13 illustrates a block diagram of an example, non-limiting system including an updated scanning protocol roster that facilitates thermally adaptive scan sequencing for computed tomography scanners in accordance with one or more embodiments described herein.

FIG. 13 illustrates a block diagram of an example, non-limiting system 1300 including an updated scanning protocol roster that can facilitate thermally adaptive scan sequencing for computed tomography scanners in accordance with one or more embodiments described herein. As shown, the system 1300 can, in some cases, comprise the same components as the system 1100, and can further comprise an updated scanning protocol roster 1302.

In various embodiments, after the analysis component 116 has identified the selected scanning protocol 1102, the execution component 118 can electronically instruct, electronically command, and/or otherwise electronically cause the CT scanner 104 to execute, perform, and/or otherwise implement the selected scanning protocol 1102. For example, the execution component 118 can instruct and/or cause a voltage parameter of the CT scanner 104 to be set to a voltage level that corresponds to the selected scanning protocol 1102 (e.g., such voltage level can be specified in the scanning protocol roster 106), can instruct and/or cause an amperage parameter of the CT scanner 104 to be set to an amperage level that corresponds to the selected scanning protocol 1102 (e.g., such amperage level can be specified in the scanning protocol roster 106), can instruct and/or cause a focal spot parameter of the CT scanner 104 to be set to a focal spot size that corresponds to the selected scanning protocol 1102 (e.g., such focal spot size can be specified in the scanning protocol roster 106), and/or can instruct and/or cause a collimation parameter of the CT scanner 104 to be set to a collimation level that corresponds to the selected scanning protocol 1102 (e.g., such collimation level can be specified in the scanning protocol roster 106). Once the adjustable parameters of the CT scanner 104 are set accordingly, the execution component 118 can activate the CT scanner 104, thereby causing the CT scanner 104 to execute/perform the selected scanning protocol 1102.

Moreover, in various aspects, the execution component 118 can electronically update the availability flag that corresponds to the selected scanning protocol 1102, thereby yielding the updated scanning protocol roster 1302. For example, if the availability flag of the selected scanning protocol 1102 is a bit and/or a Boolean variable, then the execution component 118 can switch and/or toggle the value of such bit and/or Boolean variable, if execution of the selected scanning protocol 1102 by the CT scanner 104 causes the selected scanning protocol 1102 to have now been executed its threshold number of times. As another example, if the availability flag of the selected scanning protocol 1102 is an integer-valued counter and/or tally variable, then the execution component 118 can increment such counter and/or tally variable by 1. As yet another example, if the availability flag of the selected scanning protocol 1102 is a real-valued counter and/or tally ratio, then the execution component 118 can increment the numerator of such ratio by 1. In any case, the execution component 118 can appropriately update the availability flag of the selected scanning protocol 1102, which availability flag can be specified in the scanning protocol roster 106, and the result of such update can be the updated scanning protocol roster 1302.

In various embodiments, after the CT scanner 104 has executed/performed the selected scanning protocol 1102, the thermal component 114, the analysis component 116, and/or the execution component 118 can repeat various of the above-described functionalities. In particular, after the CT scanner 104 has executed/performed the selected scanning protocol 1102, the thermal component 114 can electronically measure a new current thermal state of the CT scanner 104, the analysis component 116 can identify a new selected scanning protocol from the updated scanning protocol roster 1302, and/or the execution component 118 can cause the CT scanner 104 to execute the new selected scanning protocol. By repeating these functionalities until all scanning protocols have been executed their respective threshold number of times, the thermally adaptive scan sequencing system 102 can be considered as having determined and as having implemented a thermally-beneficial order in which to sequentially execute the scanning protocols listed in the scanning protocol roster 106. This is further clarified with respect to FIG. 14.

Figure 14:
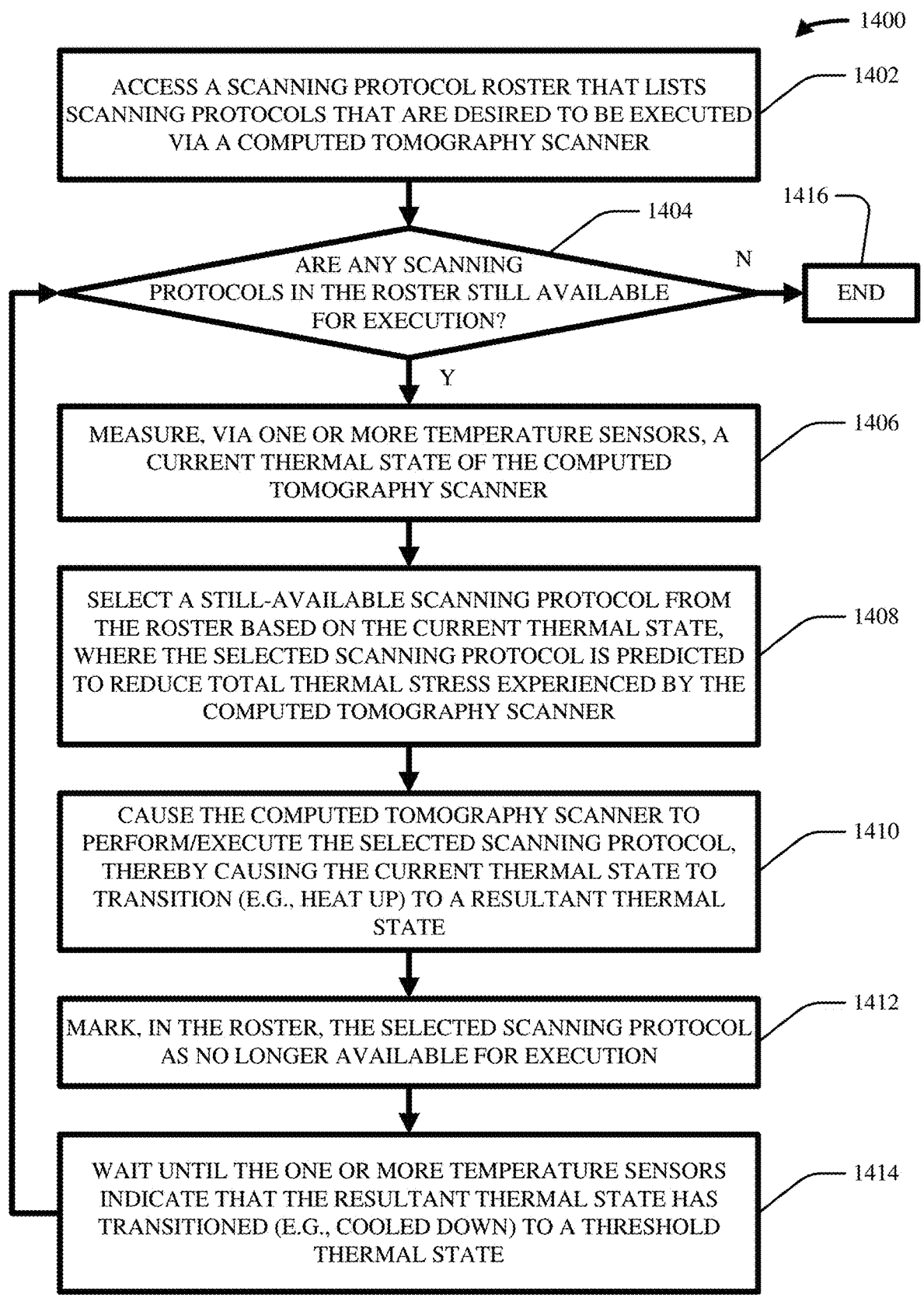
FIG. 14 illustrates a flow diagram of an example, non-limiting computer-implemented method that facilitates thermally adaptive scan sequencing for computed tomography scanners in accordance with one or more embodiments described herein.

FIG. 14 illustrates a flow diagram of an example, non-limiting computer-implemented method 1400 that can facilitate thermally adaptive scan sequencing for computed tomography scanners in accordance with one or more embodiments described herein. In various cases, the thermally adaptive scan sequencing system 102 can facilitate the computer-implemented method 1400. Note that, for ease of explanation, the computer-implemented method 1400 assumes that each scanning protocol is desired to be executed exactly once. As stated above, however, this is a mere non-limiting example of various embodiments of the subject innovation.

In various embodiments, act 1402 can include accessing, by a device (e.g., via 112) operatively coupled to a processor, a scanning protocol roster (e.g., 106) that lists scanning protocols (e.g., 202) that are desired to be executed via a computed tomography scanner (e.g., 104).

In various aspects, act 1404 can include determining, by the device (e.g., via 118 and/or via 114) whether there are any scanning protocols in the roster that are still available for execution (e.g., this can be facilitated by examining availability flags in the roster). If not, the computer-implemented method 1400 can proceed to act 1416, where it can end. If so, the computer-implemented method 1400 can proceed to act 1406.

In various instances, act 1406 can include measuring, by the device (e.g., via 114) and via one or more temperature sensors (e.g., 902), a current thermal state (e.g., 904) of the CT scanner.

In various cases, act 1408 can include selecting, by the device (e.g., via 116), a still-available scanning protocol (e.g., 1102) from the roster based on the current thermal state. In various aspects, as explained herein, the selected scanning protocol can be predicted (e.g., analytically and/or via the machine learning model 1206) to reduce and/or minimize total thermal stress (e.g., to reduce/minimize maximum temperatures and/or average temperatures) experienced by the CT scanner throughout execution of the scanning protocol roster.

In various instances, act 1410 can include causing, by the device (e.g., via 118), the CT scanner to perform/execute the selected scanning protocol. In various cases, this can cause the current thermal state of the CT scanner to heat up to a resultant thermal state.

In various aspects, act 1412 can include marking, by the device (e.g., via 118) and in the roster, the selected scanning protocol as no longer available for execution (e.g., this can involve updating an availability flag of the selected scanning protocol when it is desired to execute each scanning protocol in the roster exactly once).

In various instances, act 1414 can include waiting until the one or more temperature sensors indicate that the resultant thermal state has cooled down to a threshold thermal state. Accordingly, the computer-implemented method 1400 can proceed back to act 1404. As shown, acts 1404-1414 can iterate until no scanning protocol is still available for execution in the roster. At such point, the computer-implemented method 1400 can be considered as having executed all of the scanning protocols in the roster in a thermally-beneficial order and/or sequence.

Figure 15:
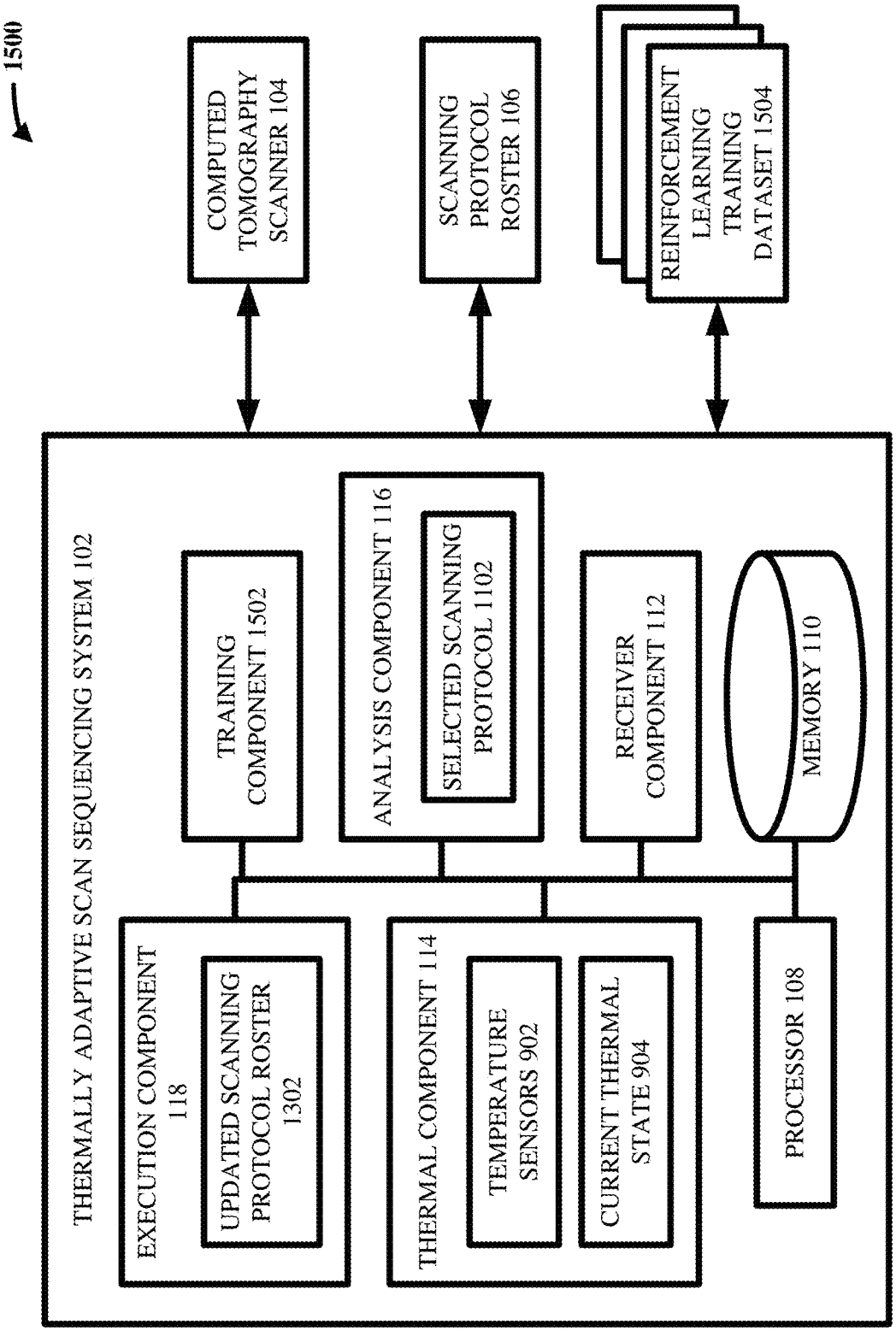
FIG. 15 illustrates a block diagram of an example, non-limiting system including a training component and a reinforcement learning training dataset that facilitates thermally adaptive scan sequencing for computed tomography scanners in accordance with one or more embodiments described herein.

FIG. 15 illustrates a block diagram of an example, non-limiting system 1500 including a training component and a reinforcement learning training dataset that can facilitate thermally adaptive scan sequencing for computed tomography scanners in accordance with one or more embodiments described herein. As shown, the system 1500 can, in some cases, comprise the same components as the system 1300, and can further comprise a training component 1502 and/or a reinforcement learning training dataset 1504 (hereafter "RL training dataset 1504").

As mentioned above, in order for the machine learning model 1206 to be able to accurately predict/infer which scanning protocol would be most thermally-beneficial to execute when given a current thermal state and a roster that specifies properties of various scanning protocols, the machine learning model 1206 should first undergo training. Accordingly, in various aspects, the receiver component 112 can electronically access and/or receive, from any suitable source, the RL training dataset 1504, and the training component 1502 can train, in a reinforcement learning fashion, the machine learning model 1206 on the RL training dataset 1504. Such trained is explained in more detail with respect to FIGS. 16-19.

Figure 16:
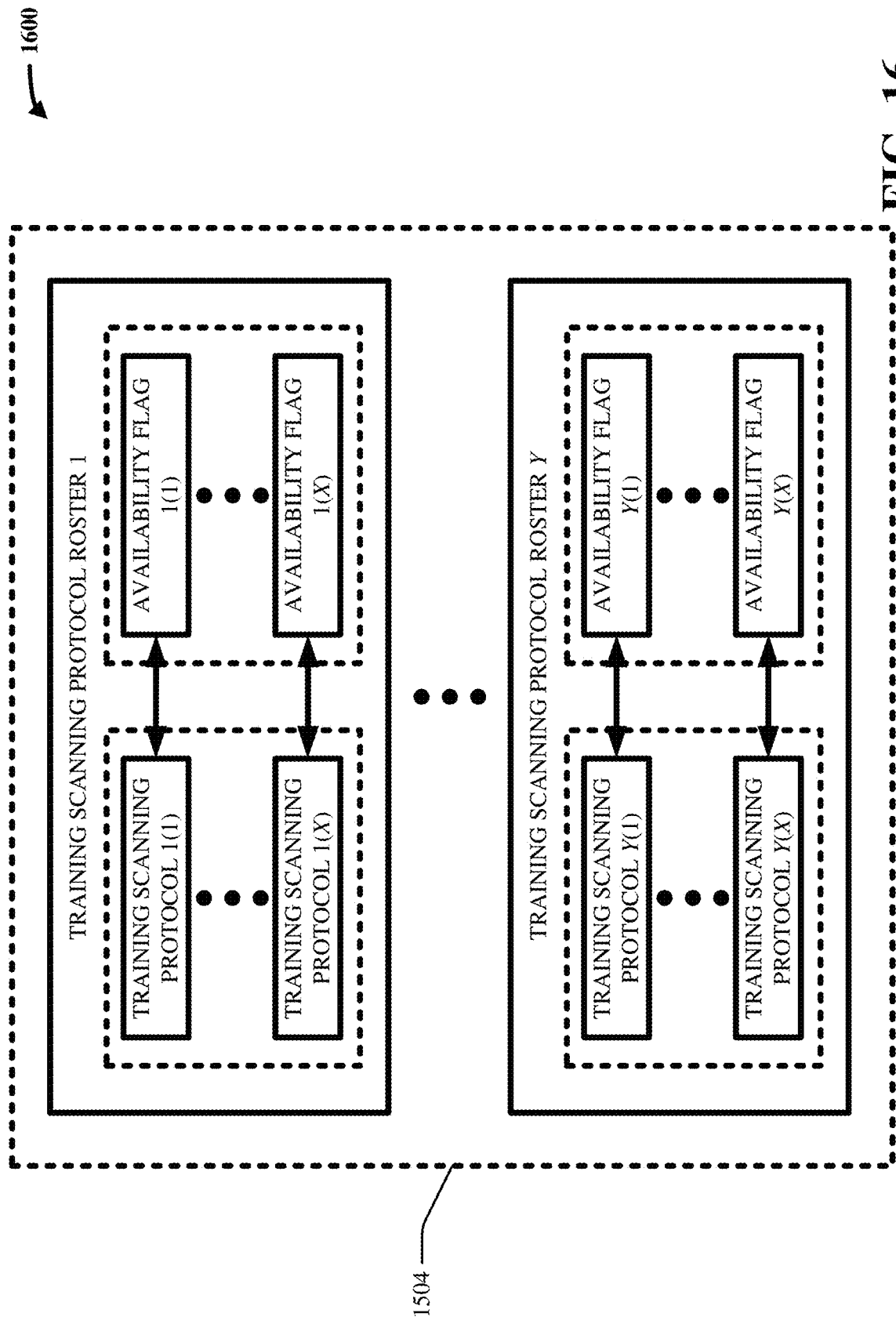
FIG. 16 illustrates an example, non-limiting block diagram of a reinforcement learning training dataset in accordance with one or more embodiments described herein.

FIG. 16 illustrates an example, non-limiting block diagram 1600 of a reinforcement learning training dataset in accordance with one or more embodiments described herein. In other words, FIG. 16 depicts a non-limiting example embodiment of the RL training dataset 1504.

As shown, the RL training dataset 1504 can, in various embodiments, include any suitable number of training scanning protocol rosters. In particular, the RL training dataset 1504 can include y rosters, for any suitable positive integer y: a training scanning protocol roster 1 to a training scanning protocol roster y. In various aspects, each training scanning protocol roster can be structured just as the scanning protocol roster 106. More specifically, each training scanning protocol roster can include a set of training scanning protocols and a set of availability flags that respectively correspond to such set of training scanning protocols. For example, the training scanning protocol roster 1 can include x protocols for any suitable positive integer x (e.g., a training scanning protocol 1(1) to a training scanning protocol 1(x)), and can also include x availability flags (e.g., an availability flag 1(1) to an availability flag 1(x), where the availability flag 1(1) can correspond to the training scanning protocol 1(1), and where the availability flag 1(x) can correspond to the training scanning protocol 1(x)). As another example, the training scanning protocol roster y can include x protocols (e.g., a training scanning protocol y(1) to a training scanning protocol y(x)), and can also include x availability flags (e.g., an availability flag y(1) to an availability flag y(x), where the availability flag y(1) can correspond to the training scanning protocol y(1), and where the availability flag y(x) can correspond to the training scanning protocol y(x)).

Although not explicitly shown in FIG. 16 for sake of space, each training scanning protocol of each training scanning protocol roster can correspond to and/or otherwise be defined by a given voltage level, a given amperage level, a given focal spot size, and/or a given collimation. In other words, each training scanning protocol roster can specify the associated voltages, amperages, focal spot sizes, and/or collimations of its constituent scanning protocols. For example, the training scanning protocol roster 1 can specify the voltage, amperage, focal spot, and/or collimation that correspond to the training scanning protocol 1(1), and/or can specify the voltage, amperage, focal spot, and/or collimation that correspond to the training scanning protocol 1(x). Likewise, the training scanning protocol roster y can specify the voltage, amperage, focal spot, and/or collimation that correspond to the training scanning protocol y(1), and/or can specify the voltage, amperage, focal spot, and/or collimation that correspond to the training scanning protocol y(x).

Although FIG. 16 shows the training scanning protocol roster 1 and the training scanning protocol roster y as having the same number of protocol-flag pairs (e.g., x), this is a non-limiting example for ease of illustration. Those having ordinary skill in the art will appreciate that, in various aspects, different training scanning protocol rosters in the RL training dataset 1504 can have the same and/or different numbers of protocol-flag pairs as each other.

In various instances, the training component 1502 can train the machine learning model in reinforcement learning fashion based on the RL training dataset 1504. This is explained more with respect to FIGS. 17-19.

Figure 17:
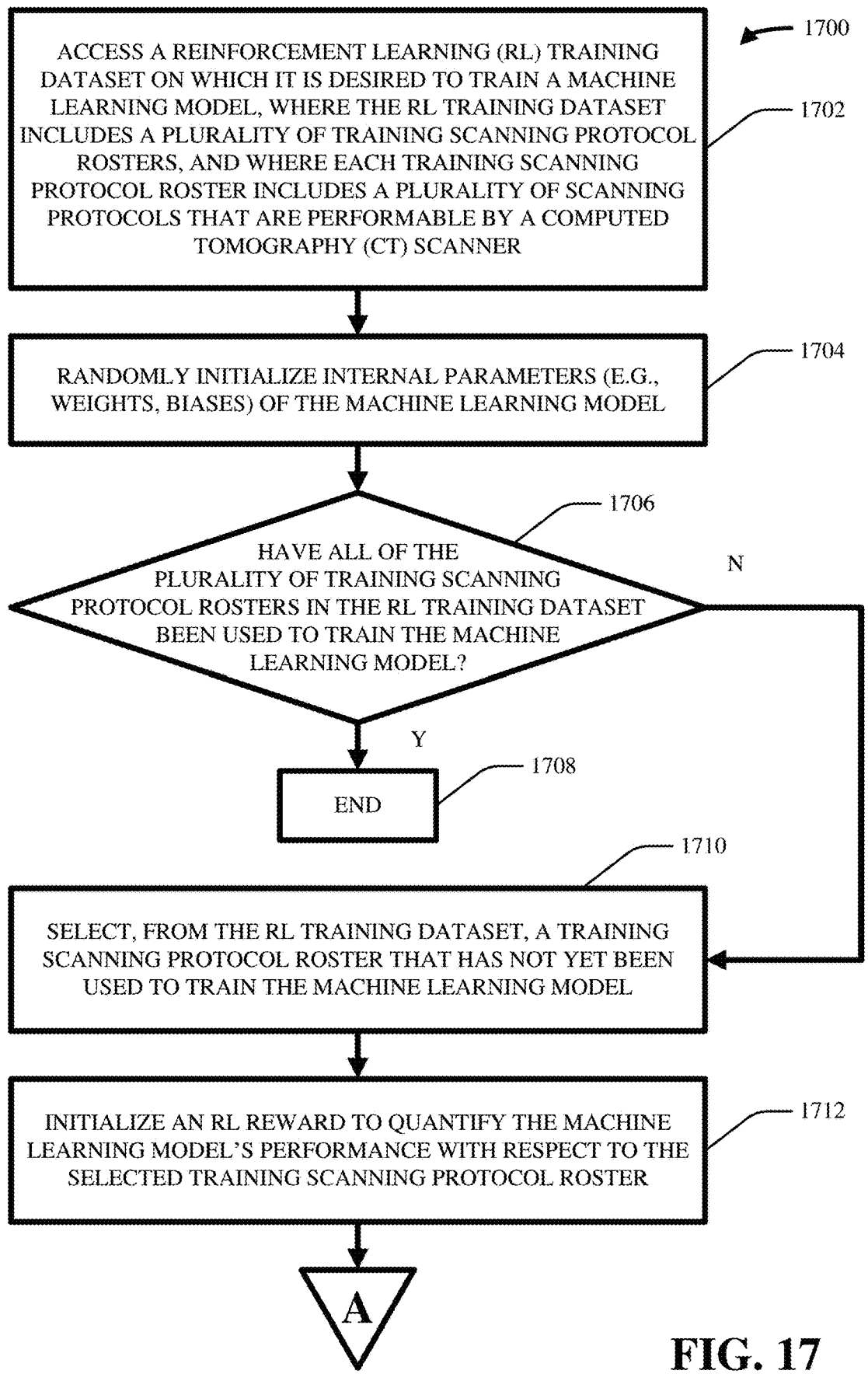
FIGS. 17-19 illustrate flow diagrams of example, non-limiting computer-implemented methods that can be implemented to train a machine learning model to facilitate thermally adaptive scan sequencing for computed tomography scanners in accordance with one or more embodiments described herein.
Figure 18:
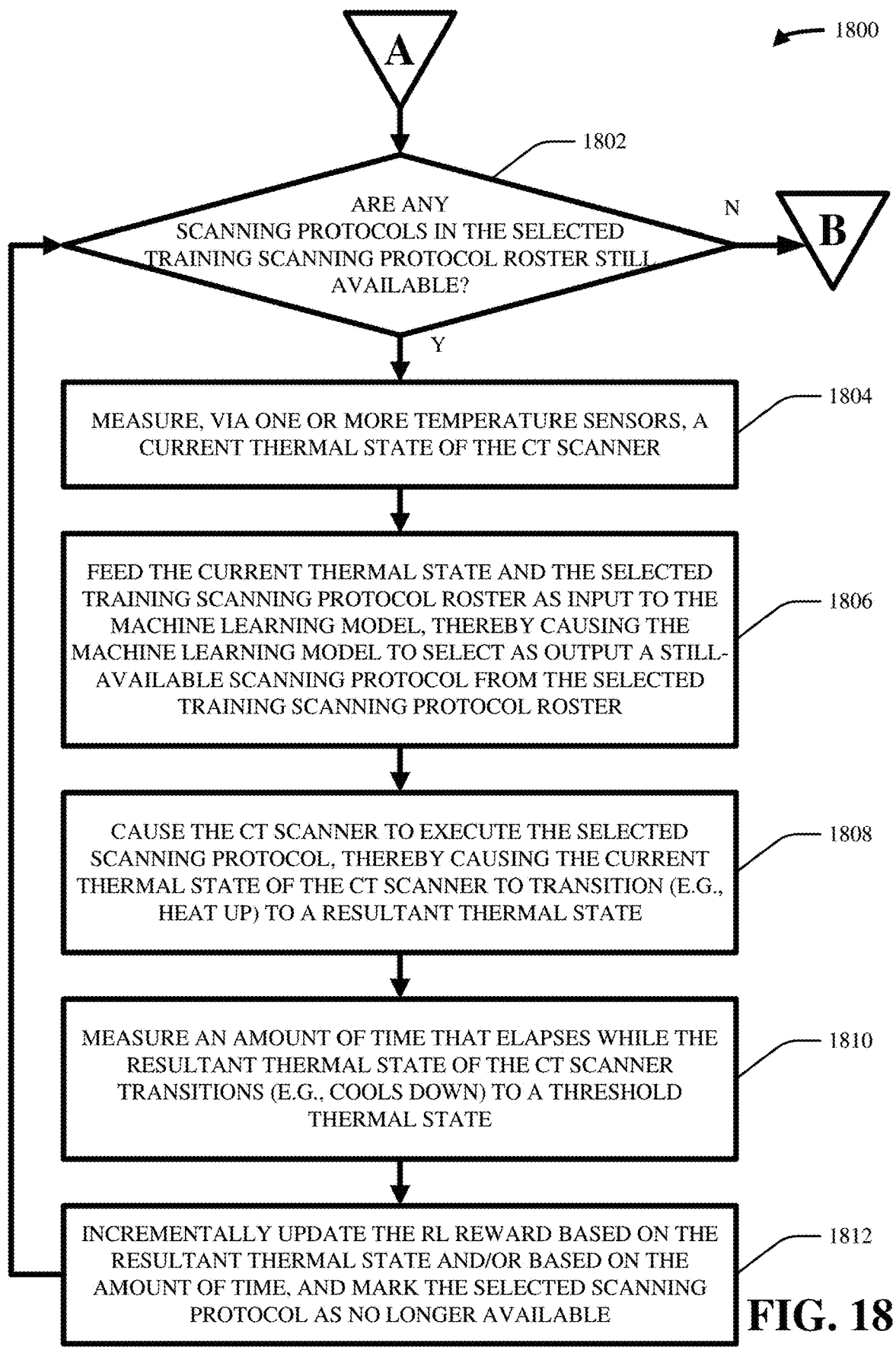
Figure 19:
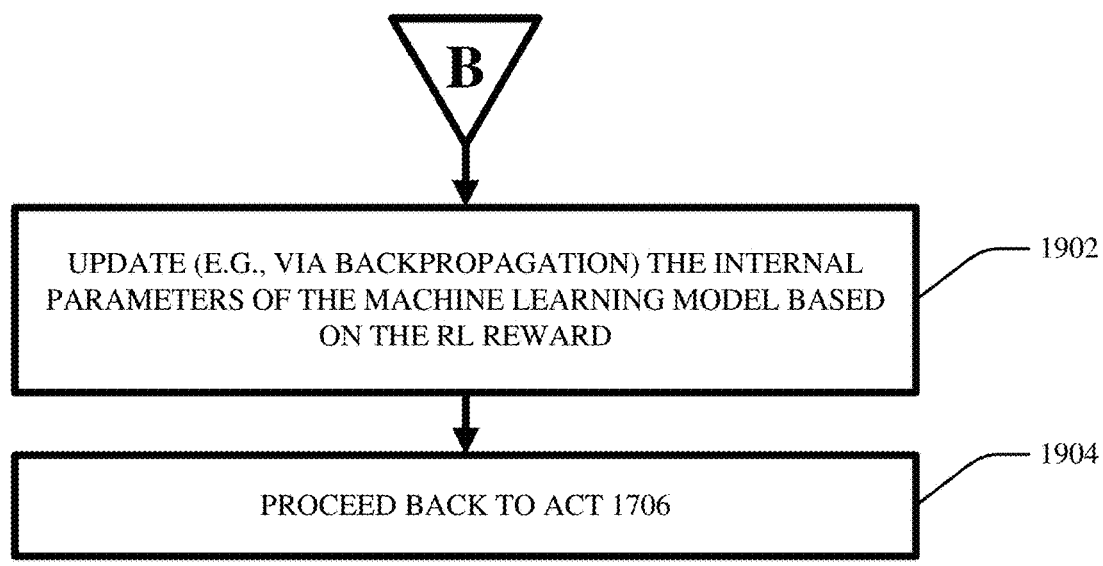

FIGS. 17-19 illustrate flow diagrams of example, non-limiting computer-implemented methods 1700, 1800, and 1900 that can be implemented to train the machine learning model 1206 to facilitate thermally adaptive scan sequencing for computed tomography scanners in accordance with one or more embodiments described herein.

In various embodiments, act 1702 can include accessing, by a device (e.g., via 112) operatively coupled to a processor, a reinforcement learning (RL) training dataset (e.g., 1504) on which it is desired to train a machine learning model (e.g., 1206). In various cases, the RL training dataset can include a plurality of training scanning protocol rosters (e.g., training scanning protocol roster 1 to training scanning protocol roster y). Moreover, in various cases, each training scanning protocol roster can include a plurality of scanning protocols (e.g., training scanning protocol 1(1) to training scanning protocol 1(x)) that are performable by a computed tomography (CT) scanner (e.g., 104).

In various aspects, act 1704 can include randomly initializing, by the device (e.g., via 1502), internal parameters (e.g., weights, biases) of the machine learning model.

In various instances, act 1706 can include determining, by the device (e.g., via 1502), whether all of the plurality of training scanning protocol rosters in the RL training dataset have already been used to train the machine learning model. If so, the computer-implemented method 1700 can proceed to act 1708, where it can end (e.g., the training of the machine learning model can be considered as complete at this point). If not, the computer-implemented method 1700 can proceed to act 1710.

In various cases, act 1710 can include selecting, by the device (e.g., via 1502) and from the RL training dataset, a training scanning protocol roster that has not yet been used to train the machine learning model.

In various aspects, act 1712 can include initializing, by the device (e.g., via 1502), a reinforcement learning (RL) reward, which can be considered as quantifying the machine learning model's performance with respect to the selected training scanning protocol roster (e.g., the RL reward can be initialized as a scalar with a value of 0). In various cases, the computer-implemented method 1700 can proceed to act 1802 of the computer-implemented method 1800.

In various embodiments, act 1802 can include determining, by the device (e.g., via 1502), whether any scanning protocols in the selected training scanning protocol roster are still available for execution (e.g., by evaluating their availability flags). If not, the computer-implemented method 1800 can proceed to act 1902 of the computer-implemented method 1900. If so, the computer-implemented method 1800 can proceed to act 1804.

In various aspects, act 1804 can include measuring, by the device (e.g., via 114) and via one or more temperature sensors (e.g., 902), a current thermal state (e.g., 904) of the CT scanner.

In various instances, act 1806 can include feeding, by the device (e.g., via 116), the current thermal state and the selected training scanning protocol roster as input to the machine learning model, thereby causing the machine learning model to select as output a still-available scanning protocol from the selected training scanning protocol roster. More specifically, the current thermal state and the training scanning protocol roster can be concatenated together, such concatenation can be received by an input layer of the machine learning model, such concatenation can complete a forward pass through one or more hidden layers of the machine learning model, and an output layer of the machine learning model can compute as output the selected scanning protocol based on activations generated by the one or more hidden layers. As mentioned above, if the machine learning model is a deep Q-network, then the output layer can compute Q-values for each still-available scanning protocol in the selected training scanning protocol roster, and whichever protocol has the highest Q-value can be considered as the selected scanning protocol. Note that, if the machine learning model has so far undergone no and/or little training, the Q-values computed by the machine learning model can be highly inaccurate (e.g., the selected scanning protocol can be actually not the most thermally-beneficial to execute when given the current thermal state).

In various aspects, act 1808 can include causing, by the device (e.g., via 118), the CT scanner to execute the selected scanning protocol. This can cause the current thermal state of the CT scanner to heat up to a resultant thermal state, which can be measured by the one or more temperature sensors.

In various instances, act 1810 can include measuring, by the device (e.g., via 114), an amount of time that elapses while the resultant thermal state of the CT scanner cools down to any suitable threshold thermal state. As those having ordinary skill in the art will appreciate, the threshold thermal state can be considered as a cooled-down state in which it is deemed to be safe and/or non-damaging for the CT scanner to execute/perform any other suitable scanning protocol.

In various cases, act 1812 can include incrementally updating, by the device (e.g., via 1502), the RL reward based on the resultant thermal state and/or based on the amount of time that it takes for the resultant thermal state to cool to the threshold thermal state. As those having ordinary skill in the art will appreciate, the incremental update to the RL reward can be equal to any suitable mathematical functions that take as arguments the resultant thermal state and/or the amount of time. For example, the RL reward can be equal to the sum of: the previous value of the RL reward; and a weighted linear, multiplicative, and/or exponential combination of the resultant thermal state and the amount of time. In any case, the magnitude of the RL reward can vary inversely with the magnitude of the thermal state and/or with the magnitude of the amount of time (e.g., the RL reward can get higher as the resultant thermal state gets less hot and/or as the amount of cool-down time gets shorter; the RL reward can get lower as the resultant thermal state gets hotter and/or as the amount of cool-down time gets longer). Accordingly, the computer-implemented method 1800 can proceed back to act 1802.

As shown, acts 1802-1812 can iterate until no scanning protocol in the selected training scanning protocol roster is still available for execution. At each iteration, the RL reward can be incrementally updated, such that, once no scanning protocol in the selected training scanning protocol roster is still available for execution, the RL reward can be considered as fully quantifying the performance of the machine learning model with respect to the selected training scanning protocol roster (e.g., can be considered as fully conveying how thermally-beneficial and/or how thermally-detrimental the order and/or sequencing chosen by the machine learning model was for the CT scanner).

In various embodiments, act 1902 can include updating, by the device (e.g., via 1502), the internal parameters (e.g., weights, biases) of the machine learning model, based on the RL reward. In various cases, this can include performing backpropagation that is driven by the RL reward (e.g., performing gradient ascent with respect to the RL reward, rather than gradient descent with respect to a standard error or loss value).

In various aspects, act 1904 can include proceeding back to act 1706 of the computer-implemented method 1700.

As can be seen from FIGS. 17-19, such training can cause the internal parameters of the machine learning model to become iteratively optimized for selecting scanning protocols that maximize the RL reward. Since the RL reward can vary inversely with the resultant thermal states and/or with the cool-down times that are caused by the selected scanning protocols, such training can enable the machine learning model to learn how to select and/or recognize scanning protocol characteristics (e.g., voltage, amperage, focal spot, collimation) that are likely to cause less heat generation and/or that are likely to require less cool-down time.

Although the herein disclosure mainly describes various embodiments of the subject innovation as predicting (e.g., via thermal modeling, and/or via the machine learning model 1206) which still-available scanning protocol should be applied next so as to minimize and/or reduce overall thermal stress experienced by the CT scanner 104, this is a mere non-limiting example for ease of explanation. In various aspects, those having ordinary skill in the art will appreciate that the herein-described teachings can be applied so as to predict (e.g., via thermal modeling, and/or via the machine learning model 1206) which still-available scanning protocol should be applied next so as to achieve a desired overall thermal stress of the CT scanner 104 (e.g., so as to control the internal temperatures of the CT scanner 104), even if such desired overall thermal stress is not a minimized and/or minimal thermal stress. For example, during CT calibration, it can sometimes be desired to cause the CT scanner 104 to experience an overall thermal stress that mimics and/or mirrors that which the CT scanner 104 is likely to experience during clinical operation and/or clinical deployment (e.g., the CT scanner 104 can, in some cases, not be expected to experience minimized thermal stress during clinical operation and/or clinical deployment). So, in cases where the machine learning model 1206 is implemented, the reinforcement learning reward that is used to train the machine learning model 1206 can be greater when a scanning protocol that is selected during training by the machine learning model 1206 causes the CT scanner 104 to achieve and/or otherwise get closer to a desired thermal state, even if this desired thermal state is not a minimum thermal state and/or is not near a minimum thermal state. Conversely, the reinforcement learning reward can be lesser when a scanning protocol that is selected during training by the machine learning model 1206 causes the CT scanner 104 to achieve and/or otherwise get closer to an undesired thermal state, even if this undesired thermal state is a minimum thermal state and/or is near a minimum thermal state. In any case, the machine learning model 1206 can be trained to maximize the reinforcement learning reward; accordingly, controlling which thermal states of the CT scanner 104 correspond to higher reinforcement learning rewards can commensurately control which scanning protocols the machine learning model 1206 learns to choose. Therefore, in some cases, the machine learning model 1206 can be configured and/or trained to minimize and/or reduce thermal stresses experienced by the CT scanner 104. In other cases, however, the machine learning model 1206 can be configured and/or trained to otherwise control thermal stresses experienced by the CT scanner 104 (e.g., to maintain internal temperatures of the CT scanner 104 at and/or near some operating value, even if such operating value is not minimized and/or minimal).

Figure 20:
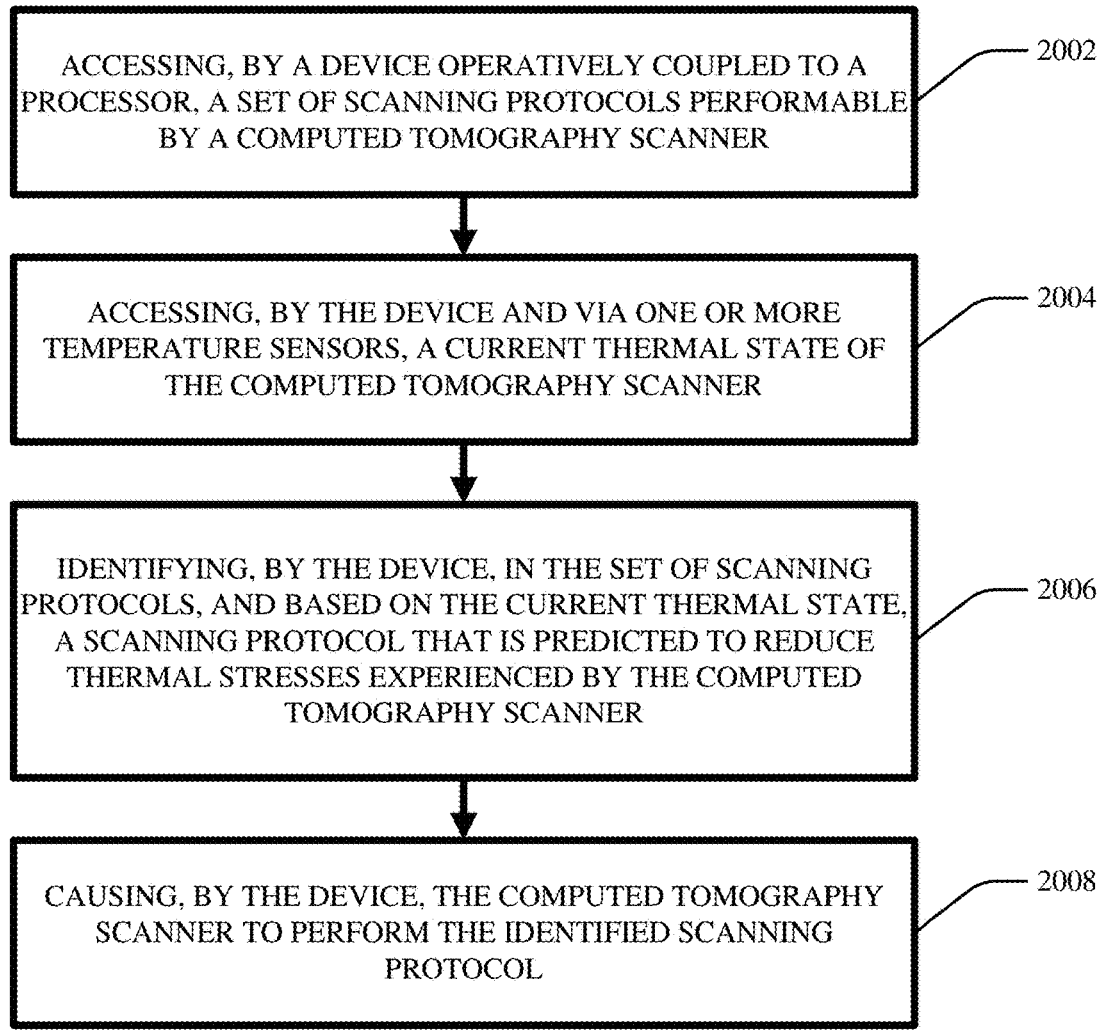
FIG. 20 illustrates a flow diagram of an example, non-limiting computer-implemented method that facilitates thermally adaptive scan sequencing for computed tomography scanners in accordance with one or more embodiments described herein.

FIG. 20 illustrates a flow diagram of an example, non-limiting computer-implemented method 2000 that can facilitate thermally adaptive scan sequencing for computed tomography scanners in accordance with one or more embodiments described herein. In various cases, the thermally adaptive scan sequencing system 102 can facilitate the computer-implemented method 2000.

In various embodiments, act 2002 can include accessing, by a device (e.g., via 112) operatively coupled to a processor, a set of scanning protocols (e.g., 106) performable by a computed tomography scanner (e.g., 104).

In various aspects, act 2004 can include accessing, by the device (e.g., via 114) and via one or more temperature sensors (e.g., 902), a current thermal state (e.g., 904) of the computed tomography scanner.

In various instances, act 2006 can include identifying, by the device (e.g., via 116), in the set of scanning protocols, and based on the current thermal state, a scanning protocol (e.g., 1102) that is predicted to reduce thermal stresses experienced by the computed tomography scanner.

In various cases, act 2008 can include causing, by the device (e.g., via 118), the computed tomography scanner to perform the identified scanning protocol.

Although not explicitly shown in FIG. 20, the identifying the identified scanning protocol can include feeding, by the device (e.g., via 116), both the current thermal state and the set of scanning protocols as inputs to a deep learning neural network (e.g., 1206), and the deep learning neural network can produce as output an indication of the identified scanning protocol (e.g., as shown in FIG. 12).

Although not explicitly shown in FIG. 20, the computer-implemented method 2000 can further include: training, by the device (e.g., via 1502), the deep learning neural network in a reinforcement learning fashion (e.g., as shown in FIGS. 17-19). In various cases, the training can include: feeding, by the device (e.g., via 116) and to the deep learning neural network, both a training thermal state (e.g., a thermal state measured at act 1804 in FIG. 18) and a set of training scanning protocols (e.g., one of the training scanning protocol roster 1 to the training scanning protocol roster y, selected at act 1710 in FIG. 17) as inputs, wherein the deep learning neural network selects as output one of the set of training scanning protocols (e.g., at act 1806 of FIG. 18); causing, by the device (e.g., via 118), the computed tomography scanner to perform the selected one of the set of training scanning protocols (e.g., at act 1808 of FIG. 18); computing, by the device (e.g., via 1502), a reinforcement learning reward based on thermal stresses experienced by the computed tomography scanner resulting from performance of the selected one of the set of training scanning protocols (e.g., at act 1812 in FIG. 18); and iteratively updating, by the device (e.g., via 1502), internal parameters of the deep learning neural network based on the reinforcement learning reward (e.g., at act 1902 of FIG. 19). In various cases, the reinforcement learning reward can be further based on an amount of time that elapses during dissipation of the thermal stresses induced by the selected one of the set of training scanning protocols (e.g., as explained with respect to act 1812 of FIG. 18).

Although not explicitly shown in FIG. 20, the identifying the identified scanning protocol can include implementing, by the device, heat transfer modeling (e.g., heat transfer equations and/or thermodynamics formulas, as explained with respect to FIG. 12).

Accordingly, various embodiments of the subject innovation can be considered as a computerized tool that can electronically determine and/or implement a thermally-beneficial order in which scanning protocols are executed by a CT scanner.

Although the herein disclosure mainly describes various embodiments as applying to X-ray tubes of a CT scanner, this is a mere non-limiting example for ease of explanation. In various cases, the herein-described teachings can be applied and/or extrapolated to any suitable components of a CT scanner for which thermal management is desired.

Although the herein disclosure mainly describes various embodiments as applying to CT scanners, this is a mere non-limiting example for ease of explanation. In various cases, the herein-described teachings can be applied and/or extrapolated to any suitable piece of equipment which can sequentially perform operations that cause heat generation and/or heat accumulation in the equipment.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example.

The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 21:
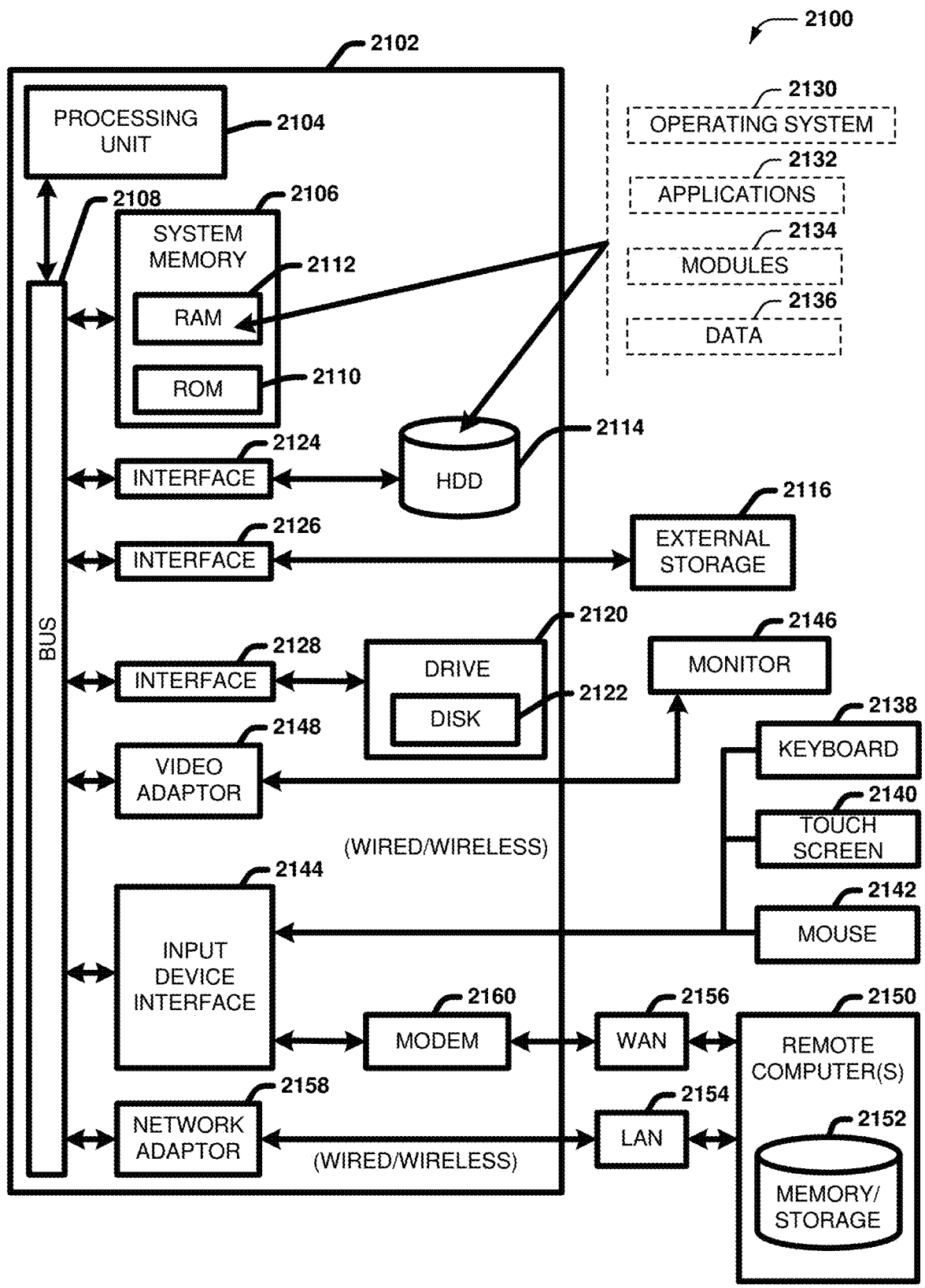
FIG. 21 illustrates a block diagram of an example, non-limiting operating environment in which one or more embodiments described herein can be facilitated.

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid-state drives or other solid-state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and a drive 2120, e.g., such as a solid-state drive, an optical disk drive, which can read or write from a disk 2122, such as a CD-ROM disc, a DVD, a BD, etc. Alternatively, where a solid-state drive is involved, disk 2122 would not be included, unless separate. While the internal HDD 2114 is illustrated as located within the computer 2102, the internal HDD 2114 can also be configured for external use in a suitable chassis (not shown). Additionally, while not shown in environment 2100, a solid-state drive (SSD) could be used in addition to, or in place of, an HDD 2114. The HDD 2114, external storage device(s) 2116 and drive 2120 can be connected to the system bus 2108 by an HDD interface 2124, an external storage interface 2126 and a drive interface 2128, respectively. The interface 2124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine (VM) of multiple VMs hosted at computer 2102. Furthermore, operating system 2130 can provide runtime environments, such as the Java runtime environment or the .NET framework, for applications 2132. Runtime environments are consistent execution environments that allow applications 2132 to run on any operating system that includes the runtime environment. Similarly, operating system 2130 can support containers, and applications 2132 can be in the form of containers, which are lightweight, standalone, executable packages of software that include, e.g., code, runtime, system tools, system libraries and settings for an application.

Further, computer 2102 can be enable with a security module, such as a trusted processing module (TPM). For instance with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 1394 serial port, a game port, a USB port, an IR interface, a BLUETOOTH® interface, etc.

A monitor 2146 or other type of display device can be also connected to the system bus 2108 via an interface, such as a video adapter 2148. In addition to the monitor 2146, a computer typically includes other peripheral output devices (not shown), such as speakers, printers, etc.

The computer 2102 can operate in a networked environment using logical connections via wired and/or wireless communications to one or more remote computers, such as a remote computer(s) 2150. The remote computer(s) 2150 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2152 is illustrated. The logical connections depicted include wired/wireless connectivity to a local area network (LAN) 2154 and/or larger networks, e.g., a wide area network (WAN) 2156. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2154 through a wired and/or wireless communication network interface or adapter 2158. The adapter 2158 can facilitate wired or wireless communication to the LAN 2154, which can also include a wireless access point (AP) disposed thereon for communicating with the adapter 2158 in a wireless mode.

When used in a WAN networking environment, the computer 2102 can include a modem 2160 or can be connected to a communications server on the WAN 2156 via other means for establishing communications over the WAN 2156, such as by way of the Internet. The modem 2160, which can be internal or external and a wired or wireless device, can be connected to the system bus 2108 via the input device interface 2144. In a networked environment, program modules depicted relative to the computer 2102 or portions thereof, can be stored in the remote memory/storage device 2152. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above, such as but not limited to a network virtual machine providing one or more aspects of storage or processing of information. Generally, a connection between the computer 2102 and a cloud storage system can be established over a LAN 2154 or WAN 2156 e.g., by the adapter 2158 or modem 2160, respectively. Upon connecting the computer 2102 to an associated cloud storage system, the external storage interface 2126 can, with the aid of the adapter 2158 and/or modem 2160, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 22:
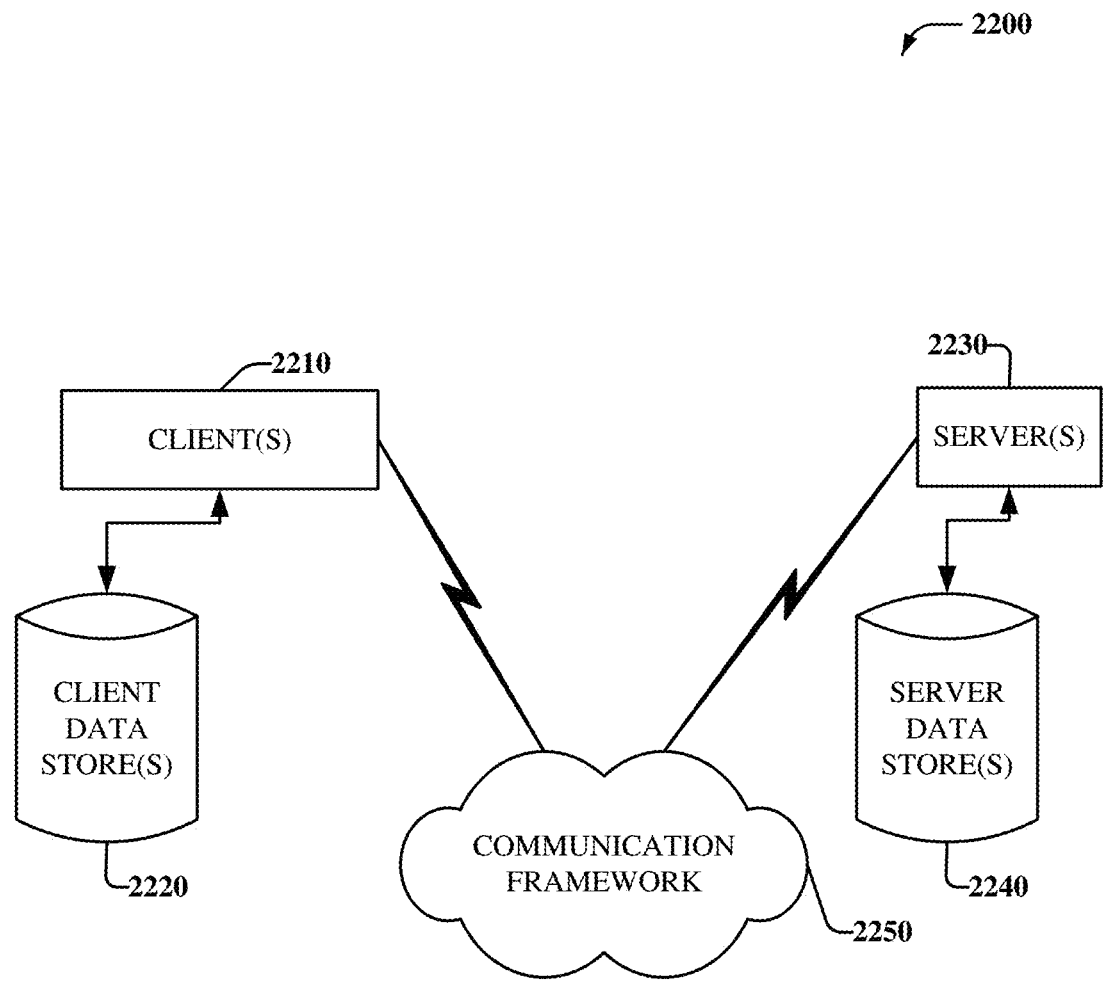
FIG. 22 illustrates an example networking environment operable to execute various implementations described herein.

FIG. 22 is a schematic block diagram of a sample computing environment 2200 with which the disclosed subject matter can interact. The sample computing environment 2200 includes one or more client(s) 2210. The client(s) 2210 can be hardware and/or software (e.g., threads, processes, computing devices). The sample computing environment 2200 also includes one or more server(s) 2230. The server(s) 2230 can also be hardware and/or software (e.g., threads, processes, computing devices). The servers 2230 can house threads to perform transformations by employing one or more embodiments as described herein, for example. One possible communication between a client 2210 and a server 2230 can be in the form of a data packet adapted to be transmitted between two or more computer processes. The sample computing environment 2200 includes a communication framework 2250 that can be employed to facilitate communications between the client(s) 2210 and the server(s) 2230. The client(s) 2210 are operably connected to one or more client data store(s) 2220 that can be employed to store information local to the client(s) 2210. Similarly, the server(s) 2230 are operably connected to one or more server data store(s) 2240 that can be employed to store information local to the servers 2230.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable components stored in a computer-readable memory, the computer-executable components comprising:
        a receiver component that accesses a set of scanning protocols performable by a computed tomography scanner;
        a thermal component that determines a current thermal state of the computed tomography scanner;
        an analysis component that identifies, in the set of scanning protocols and based on the current thermal state, a scanning protocol that is predicted to reduce or control thermal stresses experienced by the computed tomography scanner, wherein the identifying comprises feeding both the current thermal state and the set of scanning protocols as inputs to a deep learning neural network, and wherein the deep learning neural network produces as output an indication of the identified scanning protocol; and
        an execution component that controls the computed tomography scanner to perform the identified scanning protocol.

2. The system of claim 1, wherein the determining the current thermal state comprises measuring, via at least one temperature sensor of the computed tomography scanner, at least one temperature of the computed tomography scanner.

3. The system of claim 1, wherein the computer-executable components further comprise:
    a training component that trains the deep learning neural network in a reinforcement learning fashion.

4. The system of claim 3, wherein, during training of the deep learning neural network, the training component feeds the deep learning neural network both a training thermal state and a set of training scanning protocols as inputs, the deep learning neural network selects as output one of the set of training scanning protocols, the execution component causes the computed tomography scanner to perform the selected one of the set of training scanning protocols, the training component computes a reinforcement learning reward based on thermal stresses experienced by the computed tomography scanner resulting from performance of the selected one of the set of training scanning protocols, and the training component iteratively updates internal parameters of the deep learning neural network based on the reinforcement learning reward.

5. The system of claim 4, wherein the training component iteratively updates the internal parameters via backpropagation that is driven by the reinforcement learning reward.

6. The system of claim 4, wherein the reinforcement learning reward is further based on an amount of time that elapses during dissipation of the thermal stresses induced by the selected one of the set of training scanning protocols.

7. The system of claim 1, wherein the identifying further comprises heat transfer modeling.

8. The system of claim 1, wherein the thermal component that determines the current thermal state via at least one temperature sensor of the computed tomography scanner.

9. A computer-implemented method, comprising:
accessing, by a device operatively coupled to a processor, a set of scanning protocols performable by a computed tomography scanner;
determining, by the device, a current thermal state of the computed tomography scanner;
identifying, by the device, in the set of scanning protocols, and based on the current thermal state, a scanning protocol that is predicted to reduce or control thermal stresses experienced by the computed tomography scanner, wherein the identifying the identified scanning protocol comprises feeding both the current thermal state and the set of scanning protocols as inputs to a deep learning neural network, and wherein the deep learning neural network produces as output an indication of the identified scanning protocol; and
causing, by the device, the computed tomography scanner to perform the identified scanning protocol.

10. The computer-implemented method of claim 9, further comprising:
training, by the device, the deep learning neural network in a reinforcement learning fashion.

11. The computer-implemented method of claim 10, wherein the training includes:
feeding, by the device and to the deep learning neural network, both a training thermal state and a set of training scanning protocols as inputs, wherein the deep learning neural network selects as output one of the set of training scanning protocols;
causing, by the device, the computed tomography scanner to perform the selected one of the set of training scanning protocols;
computing, by the device, a reinforcement learning reward based on thermal stresses experienced by the computed tomography scanner resulting from performance of the selected one of the set of training scanning protocols; and
iteratively updating, by the device, internal parameters of the deep learning neural network based on the reinforcement learning reward.

12. The computer-implemented method of claim 11, wherein the iteratively updating the internal parameters includes performing, by the device, backpropagation that is driven by the reinforcement learning reward.

13. The computer-implemented method of claim 11, wherein the reinforcement learning reward is further based on an amount of time that elapses during dissipation of the thermal stresses induced by the selected one of the set of training scanning protocols.

14. The computer-implemented method of claim 9, wherein the identifying further comprises heat transfer modeling.

15. A computer program product for facilitating thermally adaptive scan sequencing for computed tomography scanners, the computer program product comprising a non-transitory computer-readable memory having program instructions embodied therewith, the program instructions executable by a processor to cause the processor to:
access a set of scanning protocols performable by a computed tomography scanner;
determine a current thermal state of the computed tomography scanner;
identify, in the set of scanning protocols and based on the current thermal state, a scanning protocol that is predicted to reduce or control thermal stresses experienced by the computed tomography scanner, wherein the identifying the identified scanning protocol comprises feeding both the current thermal state and the set of scanning protocols as inputs to a deep learning neural network, and wherein the deep learning neural network produces as output an indication of the identified scanning protocol; and
cause the computed tomography scanner to perform the identified scanning protocol.

16. The computer program product of claim 15, wherein the identifying further comprises heat transfer modeling.

17. The computer program product of claim 15, wherein the program instructions are further executable to cause the processor to:
train the deep learning neural network in a reinforcement learning fashion.

18. The computer program product of claim 17, wherein, during training of the deep learning neural network, the processor feeds the deep learning neural network both a training thermal state and a set of training scanning protocols as inputs, the deep learning neural network selects as output one of the set of training scanning protocols, the processor causes the computed tomography scanner to perform the selected one of the set of training scanning protocols, the processor computes a reinforcement learning reward based on thermal stresses experienced by the computed tomography scanner resulting from performance of the selected one of the set of training scanning protocols, and the processor iteratively updates internal parameters of the deep learning neural network based on the reinforcement learning reward.

19. The computer program product of claim 18, wherein the processor iteratively updates the internal parameters via backpropagation that is driven by the reinforcement learning reward.

20. The computer program product of claim 18, wherein the reinforcement learning reward is further based on an amount of time that elapses during dissipation of the thermal stresses induced by the selected one of the set of training scanning protocols.

* * * * *